United States Patent
Narayan

(10) Patent No.: US 12,463,820 B1
(45) Date of Patent: Nov. 4, 2025

(54) CRYPTOGRAPHIC INTEGRITY VERIFICATION AND ADAPTIVE ARTIFICIAL INTELLIGENCE DOCUMENT EXTRACTOR SYSTEM FOR WORKFLOW AUTOMATION IN VARIOUS DOMAINS

(71) Applicant: Legaci Labs, Inc., Everett, WA (US)

(72) Inventor: Vinay Anant Narayan, Everett, WA (US)

(73) Assignee: LEGACI LABS INC., Everett, WA (US)

( * ) Notice: Subject to any disclaimer, the term of this patent is extended or adjusted under 35 U.S.C. 154(b) by 0 days.

(21) Appl. No.: 19/272,328

(22) Filed: Jul. 17, 2025

(51) Int. Cl.
| | |
|---|---|
| H04L 29/06 | (2006.01) |
| G06T 5/50 | (2006.01) |
| G06T 7/13 | (2017.01) |
| G06V 10/25 | (2022.01) |
| G16H 10/60 | (2018.01) |
| H04L 9/32 | (2006.01) |

(52) U.S. Cl.
CPC .............. *H04L 9/3239* (2013.01); *G06T 5/50* (2013.01); *G06T 7/13* (2017.01); *G06V 10/25* (2022.01); *G16H 10/60* (2018.01); *G06T 2207/20221* (2013.01)

(58) Field of Classification Search
CPC ........... H04L 9/3239; G06T 7/13; G06T 5/50; G06T 2207/20221; G16H 10/60; G06V 10/25; G06V 30/18; G06N 20/00; G06N 3/08; G06F 40/279; G06F 40/10
See application file for complete search history.

(56) References Cited

U.S. PATENT DOCUMENTS

| | | | |
|---|---|---|---|
| 10,049,096 B2* | 8/2018 | Deepak .................. | G06V 10/22 |
| 12,243,082 B1* | 3/2025 | Stifter .................... | G06N 20/00 |
| 2022/0392047 A1* | 12/2022 | Wheaton ................ | G06V 10/40 |
| 2024/0193978 A1* | 6/2024 | Yi .......................... | G06V 10/273 |
| 2025/0117405 A1* | 4/2025 | Avlani ................... | G06F 16/285 |
| 2025/0131759 A1* | 4/2025 | Zhao ...................... | G06V 30/413 |

* cited by examiner

*Primary Examiner* — Yogesh Paliwal

(57) ABSTRACT

A system and method for secure and efficient automated workflows includes two complementary components. A digest embedding system verifies the integrity of workflow event sequences using a rolling SHA-256 digest salted with microsecond-precision timestamps. A template-caching extractor adaptively processes heterogeneous electronic documents. The digest system enables decentralized verification without querying centralized audit logs. The extractor uses a layout hash derived from document structure to route documents through either a low-latency, rule-based extraction path or a fallback artificial intelligence model path. New templates are generated for previously unseen layouts exceeding a confidence threshold. The disclosed methods improve latency, resource utilization, energy utilization and scalability in sectors including finance, healthcare, and logistics, offering advantages over existing prior art in terms of integration, specific mechanisms for timestamp salting, hardware security module utilization for workflow events, layout-based template caching, and adaptive learning.

27 Claims, 18 Drawing Sheets

900

HL7/FHIR HEALTHCARE MESSAGE — 902

MESSAGE HEADER — 904
MSH | ^~\ | EHR_SYSTEM | HOSPITAL_12345 | HIE_GATEWAY | REGION_01 | 20250520143025.123456 | | ORU^R)1 | MSG_20250520_001 | P | 2.8 | | | AL | NE
*Message Control ID: MSG_20250520_001*
*Message Type: ORU (Observation Result), Event: R01*

PATIENT IDENTIFICATION — 906
PID | 1 | MRN12345678^^^HOSPITAL_12345^MR | | DOE^JOHN^MIDDLE | | 19850315 | M | | | 123 MAIN ST^^ANYTOWN^ST^12345^USA | | | | | | |
*MRN: MRN12345678, Encounter ID: ENC987654321*

CLINICAL OBSERVATIONS — 908
OBR | 1 | LAB_ORDER_001 | LAB_RESULT_001^CBC^L | | | 20250520143000 | | |
OBX | 1 | NM | WBC^White Blood Count^L | | 7.2 | 10*3/uL | 4.0-11.0 | N | | | F |
OBX | 2 | NM | RBC^Red Blood Count^L | | 4.8 | 10*6/uL | 4.2-5.9 | N | | | F |
*Lab Results: CBC with differential, Status: Final*
*Observation Timestamp: 2025-05-20T14:30:00.000000*

HEALTHCARE WORKFLOW EVENTS — 910
• Patient Admission: 2025-05-20T08:15:32.456789
• Lab Order Placed: 2025-05-20T09:22:15.123456
• Rersults Available: 2025-05-20T14:30:00.789012

EMBEDDED DIGEST SECTION — 912
NTE | 1 | L | DIGEST_METADATA^SHA-256^
fa7bf873f58929a4d8bc75126da5856252e48bf4c4fd9d58fb0c50c9285aa32b
*Terminal digest from healthcare workflow event sequence*

*FHIR-compliant JSON format also supported with digest in metadata extension* — 914

HIPAA COMPLIANT | HL7 v2.x | FHIR R4 COMPATIBLE
*Digest computation preserves patient privacy while ensuring message integrity*

FIG. 9

CRYPTOGRAPHIC INTEGRITY VERIFICATION AND ADAPTIVE ARTIFICIAL INTELLIGENCE DOCUMENT EXTRACTOR SYSTEM FOR WORKFLOW AUTOMATION IN VARIOUS DOMAINS

FIELD OF THE DISCLOSURE

Aspects of the present disclosure generally relate to two complementary components: a digest embedding system for verifying the integrity of workflow event sequences using a rolling SHA-256 digest salted with microsecond-precision timestamps and a template-caching extractor for adaptive processing of heterogeneous electronic documents.

BACKGROUND

Automated cloud workflows routinely generate large volumes of event data and require efficient processing of heterogeneous electronic documents. However, ensuring event integrity and scalable document extraction without sacrificing latency or resource efficiency remains a technical challenge.

There are several problems associated with managing cloud workflows. A first problem relates to integrity verification. Existing systems typically log events in centralized databases and perform verification by querying audit trails. In high-throughput environments, such queries can introduce delays of 100-500 ms and create I/O bottlenecks. Blockchain-based verification has been explored, but such verification incurs excessive computational overhead (e.g., cryptographic proof construction, consensus delays) and is often unsuitable for low-latency transactional systems.

A second issue is a document extraction problem. Most systems rely on brittle, template-based rules that fail for unseen document layouts. General-purpose AI systems (e.g., transformer-based large language models) are flexible but computationally expensive, often requiring >2s per document and using >1 GB of graphics processing unit (GPU) memory. In typical document pipelines, over 30% of layouts are novel, leading to high fallback usage and cost.

SUMMARY

What is needed in the art is a solution that addresses the issues raised above, particularly concerning integrity verification for electronic documents and document extraction. Document extraction requires a document layout analysis and classification as steps to document understanding by artificial intelligence (AI) models. This disclosure introduces systems and methods for secure and efficient processing of automated digital workflows in, for example, distributed cloud computing environments. More specifically, the concepts disclosed herein address two technical problems: (1) decentralized cryptographic verification of ordered workflow events using timestamp-salted rolling digests; and (2) adaptive document extraction using layout hash-based routing to balance central processing unit (CPU)-based template processing and GPU-driven AI fallback. There is a need in the art for systems that both provides (1) low-latency, decentralized event sequence verification with minimal audit-log dependency, specifically using timestamp-salting within a rolling digest computed by a hardware security module (HSM); and (2) adaptively extracts structured data from electronic documents by learning and caching templates for recurring layouts, using a structural layout hash for routing and automatic template generation from AI outputs.

There are three general concepts of this disclosure. A first concept focuses on systems and methods for cryptographic integrity verification. In some aspects, the techniques described herein relate to a method for verifying an integrity of event sequences of workflow events in a workflow system, the method including: logging each event of a set of event sequences associated with workflow events including one or more of: (i) a workflow instance identifier for a workflow instance, (ii) an event type, (iii) a serialized event payload, and (iv) an event timestamp; computing, based on a prior digest value, the serialized event payload, and a salt derived from the event timestamp, a respective rolling cryptographic digest for each event over the set of event sequences; embedding a terminal digest value for the set of event sequences associated with the workflow instance into an electronic message to obtain an embedded terminal digest; and transmitting the electronic message to a recipient system, wherein the recipient system verifies the integrity of the set of event sequences by independently recomputing the respective rolling cryptographic digest from locally accessible data to obtain a result and comparing the result to the embedded terminal digest.

In some aspects, the techniques described herein relate to a system for verifying an integrity of event sequences of workflow events in a workflow system, the system including: at least one processor; and a computer-readable storage medium storing instructions, which, when executed by the at least one processor, cause the at least one processor to be configured to: log each event of a set of event sequences associated with workflow events including one or more of: (i) a workflow instance identifier for a workflow instance, (ii) an event type, (iii) a serialized event payload, and (iv) an event timestamp; compute, based on a prior digest value, the serialized event payload, and a salt derived from the event timestamp, a respective rolling cryptographic digest for each event over the set of event sequences associated with the workflow events; embed a terminal digest value for the set of event sequences into an electronic message to obtain an embedded terminal digest; and transmit the electronic message to a recipient system, wherein the recipient system verifies the integrity of the set of event sequences by independently recomputing the respective rolling cryptographic digest from locally accessible data to obtain a result and comparing the result to the embedded terminal digest.

In some aspects, the techniques described herein relate to a method including: receiving, from a computing device, an electronic message including an embedded terminal digest; and recomputing, for each event over a set of event sequences associated with workflow events, a respective rolling cryptographic digest from locally accessible data to obtain a result and comparing the result to the embedded terminal digest, wherein the embedded terminal digest is obtained on the computing device via steps including: logging each event of the set of event sequences associated with workflow events including one or more of: (i) a workflow instance identifier for a workflow instance, (ii) an event type, (iii) a serialized event payload, and (iv) an event timestamp; computing, based on a prior digest value, the serialized event payload, and a salt derived from the event timestamp, a respective rolling cryptographic digest for each event over the set of event sequences; and embedding a terminal digest value for the set of event sequences associated with the workflow events into the electronic message to obtain an embedded terminal digest.

A second concept relates to a system and method for adaptive AI document extraction. In some aspects, the techniques described herein relate to a method for adaptive extraction of structured data from electronic documents, the method including: performing edge detection on an electronic document to obtain an edge-detected image; overlaying a fixed-size grid on the edge-detected image; computing edge density values for grid cells of the fixed-size grid to form a layout vector; and hashing the layout vector using a cryptographic hash function to obtain a layout hash; querying, using the layout hash, a template cache to identify a matching extraction template; when the matching extraction template is found in the template cache, extracting data fields from the electronic document using parameters defined in the matching extraction template; when no matching extraction template is found in the template cache, routing the electronic document to an artificial intelligence model that returns extracted data and a confidence score; and when the confidence score exceeds a defined threshold: generating a new extraction template; and storing the new extraction template in the template cache, indexed by the layout hash.

In some aspects, the techniques described herein relate to a system for adaptive extraction of structured data from electronic documents, the system including: at least one processor; and a computer-readable storage medium storing instructions, which, when executed by the at least one processor, cause the at least one processor to be configured to: perform edge detection on an electronic document to obtain an edge-detected image; overlay a fixed-size grid on the edge-detected image; compute edge density values for grid cells of the fixed-size grid to form a layout vector; and hash the layout vector using a cryptographic hash function to obtain a layout hash; query, using the layout hash, a template cache to identify a matching extraction template; when the matching extraction template is found, extracting data fields from the electronic document using parameters defined in the matching extraction template; when no matching extraction template is found, route the electronic document to an artificial intelligence model that returns extracted data and a confidence score; and when the confidence score exceeds a defined threshold: generate a new extraction template; and store the new extraction template in the template cache, indexed by the layout hash.

A third concept relates to integrated methods and systems that combine the first and second examples set forth above. In some aspects, the techniques described herein relate to a system for providing workflow automation including: a first subsystem configured to: log workflow events; compute a timestamp-salted rolling digest using a hardware security module; and embed a terminal digest in a message for external verification; and a second subsystem for processing electronic documents using layout hash-based routing for adaptive extraction, the second subsystem configured to: apply a fast extraction path using cached templates; applying, based on a high confidence determination, a fallback path using a transformer-based artificial intelligence model that generates new templates upon high confidence, wherein the second subsystem is configured to process both event messages and associated electronic documents for a same workflow instance, and wherein the terminal digest generated by the first subsystem serves as a cryptographic trigger or reference for initiating the processing of associated electronic documents in the second subsystem.

In some aspects, the techniques described herein relate to a method for integrated workflow verification and document processing, the method including: executing a workflow instance including a sequence of events, each event of the sequence of events being associated with a timestamp; computing, based on a cryptographic hash function applied to a previous digest value, serialized event data, and a timestamp-derived salt, a rolling digest for the sequence of events; upon completion of the workflow instance, generating a terminal digest representing a final state of the rolling digest; detecting a generation of the terminal digest as a trigger event; in response to the trigger event, automatically initiating document processing for electronic documents associated with the workflow instance; retrieving the electronic documents using a workflow instance identifier common to both the sequence of events and the electronic documents; processing the electronic documents using an adaptive template-based extraction system to obtain results; embedding the terminal digest as metadata within the results to obtain an embedded terminal digest; and storing the results with the embedded terminal digest.

In some aspects, the techniques described herein relate to a system for integrated workflow verification and document processing, the system including: at least one processor; and a computer-readable storage medium storing instructions, which, when executed by the at least one processor, cause the at least one processor to be configured to: execute a workflow instance including a sequence of events, each event associated with a high-precision timestamp; compute, based on a cryptographic hash function applied to a previous digest value, serialized event data, and a timestamp-derived salt, a rolling digest for the sequence of events; upon completion of the workflow instance, generate a terminal digest representing a final state of the rolling digest; detect a generation of the terminal digest as a trigger event; in response to the trigger event, automatically initiate document processing for electronic documents associated with the workflow instance; retrieve the electronic documents using a workflow instance identifier common to both the sequence of events and the electronic documents; process the electronic documents using an adaptive template-based extraction system to obtain results; embed the terminal digest as metadata within the results to obtain an embedded terminal digest; and store the results with the embedded terminal digest.

Aspects generally include a method, apparatus, system, computer program product, non-transitory computer-readable medium, user equipment, network node, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices. Aspects may be implemented in chip-level components, modular components, non-modular components, non-chip-level components, device-level components, and/or system-level components. Devices incorporating the described aspects and features may include additional components and features for the implementation and practice of the claimed and described aspects. It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example healthcare message format with an embedded digest field, in accordance with some examples;

DETAILED DESCRIPTION

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Integrity verification involves the use of a number of technologies. The concept of using cryptographic hashes to ensure data integrity is useful. Rolling hashes, such as those based on the Rabin-Karp algorithm, can be applied to efficiently calculate hash values over sliding data windows, primarily used in string matching and duplicate data detection.

Blockchain technology has been widely proposed for timestamping and ensuring the integrity of digital content. Blockchain systems embed cryptographic hashes of data into blockchain transactions, leveraging the decentralized and immutable nature of the blockchain to provide tamper-proof records of existence at a specific time. While offering strong integrity, blockchain-based solutions often face challenges with transaction latency, cost, and scalability, particularly for high-throughput, low-latency systems. Some hybrid approaches combine blockchain with cloud storage to mitigate these issues.

Figure 1A:
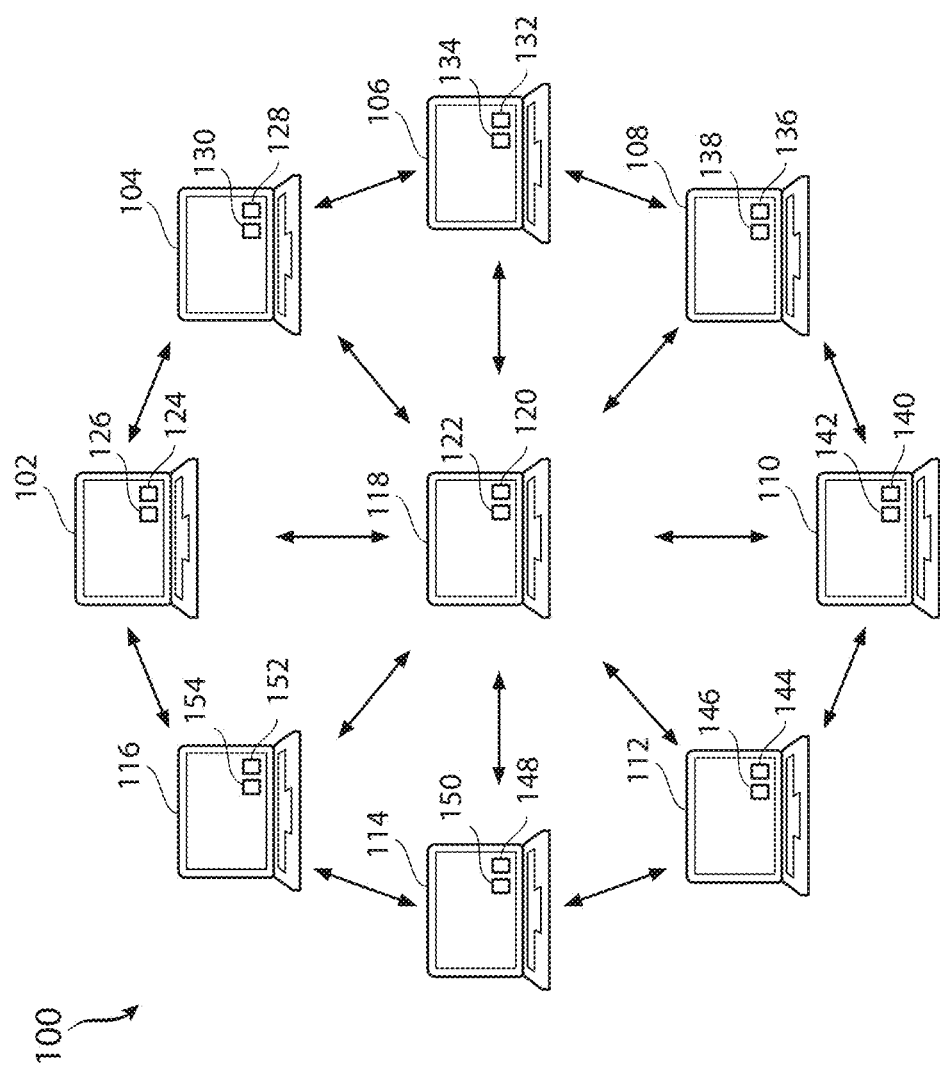
FIG. 1A illustrates a blockchain network, in accordance with some examples.

FIG. 1A illustrates a general blockchain network 100, in accordance with some examples of this disclosure. The general blockchain network 100 can represent different nodes each communicating with each other, according to some aspects of the present disclosure. The general blockchain network 100 includes a plurality of distributed nodes or computing devices 102, 104, 106, 108, 110, 112, 114, 116, 118. Each of these nodes and computing devices includes a component, module or software as part of a distributed consensus algorithm 120, 124, 128, 132, 136, 140, 144, 148, 152 a part of a distributed consensus algorithm in which transactions that are to be processed by the blockchain network are voted upon by the distributed consensus algorithm. The general blockchain network 100 can have various consensus mechanisms or related techniques, including proof of stake, game theory, direct acyclic graph tangle (DAG) consensus, leader election-based consensus, and practical Byzantine fault tolerance (PBFT). Other techniques related to consensus mechanisms include a multi-signature requirement which is a cryptographic assumption technique to validate a submission to a consensus mechanism. Other approaches to consensus are also provided herein.

Another component, module or software provide a distributed ledger 122, 126, 130, 134, 138, 142, 146, 150, 154. The general operation of the blockchain is that it will record across the distributed identical ledgers 122, 126, 130, 134, 138, 142, 146, 150, 154 transactions that are voted upon by the consensus algorithm 120, 124, 128, 132, 136, 140, 144, 148, 152. The recorded transactions (such as a DEX, smart contract, or transfer of a cryptocurrency, or a confirmation of an event or of a validity of a document), are immutable in that the way the distributed ledger works is through adding to the ledger or a hashed-linked list individual transactions in which each block is connected via a hash to data in a previous block. The general blockchain network 100 is a distributed database that maintains a continuously growing list of ordered records, called blocks. The blocks are linked using cryptography. Each block contains a cryptographic hash of the previous block, a timestamp, and transaction data. The general blockchain network 100 is a decentralized, and can include distributed and public or private digital identical ledgers that are used to record transactions across many computers so that the record cannot be altered retroactively without the alteration of all subsequent blocks and the consensus of the network. Once a transaction is recorded and added to the chain, it is extremely difficult to alter that information without changing all subsequent blocks. The data regarding a transaction proceeds through a transition from one state (the pre-ledger state) which could be hacked or shared to another state (a post-ledger state) in which the transaction or data is immutable to the extent that the transaction cannot be altered without the consensus of the general blockchain network 100. These characteristics cannot be obtained via a generic computer storing data in a memory. In such a case, the structure of a generic computer does not enable immutable storage of data on the memory of the computer.

The general blockchain network 100 can be used to record data or transactions related to a number of different use cases. For example, the general blockchain network 100 can be used to implement real-world asset tokenization, stable coins, multi-play game coordination, DEX's (decentralized exchanges), AMMs (automated market maker), and so forth to identify some non-limiting examples. The general blockchain network 100 can be used as disclosed herein run smart contracts or otherwise run an exchange such as a DEX or an AMM network such as in connection with the platform 120. The general blockchain network 100 can correspond to the blockchain network 110 of FIG. 1A.

Conventional cryptographic timestamping, as defined by standards like RFC 3161 (Time-Stamp Protocol or TSP), involves a trusted Time-Stamp Authority (TSA) that receives a hash of data from a client, combines it with a timestamp, and cryptographically signs this bundle. The approach provides evidence that the data existed at the time of timestamping but relies on the availability and trustworthiness of the TSA and does not inherently secure a sequence of events in a rolling manner.

Other technologies relate to document extraction. Document layout analysis and classification are foundational steps in document understanding. Various techniques, including machine learning models (e.g., PP-DocLayout) using detectors like RT-DETR (Real-Time DEtection TRansformer) are used to identify and localize structural elements like titles, text blocks, and tables.

Template-based extraction systems have long been used, where templates define fields and their locations, often configured by users. Some systems employ layout-based classification to identify a document type and then apply a corresponding pre-defined template (e.g., U.S. Pat. No. 12,154,358, incorporated herein by reference). These systems may include feedback mechanisms for improving template accuracy.

The use of artificial intelligence (AI) and machine learning (ML) models, including transformer-based large language models like LayoutLM and services from cloud providers (e.g., Google Document AI, AWS Textract, Azure Form Recognizer), is common for extracting information from documents, especially unstructured or semi-structured ones. These models can understand semantic content and layout.

Caching techniques are employed to improve the efficiency of AI systems. For instance, caching LLM (large language model) prompts and their responses (both exact matches and semantically similar matches) can reduce redundant computations and costs (e.g., Portkey Docs).

Adaptive optical character recognition (OCR) systems and hybrid approaches attempt to improve accuracy for challenging documents, such as historical texts, by adapting to the specific characteristics of the document set.

Methods for automatic template selection exist, where systems calculate similarity ratios between an input document and a set of candidate templates, ranking them to find the best match (e.g., US Publication No.: 2022/0027615). Some older systems (e.g., U.S. Pat. No. 9,323,731) used DOM (Document Object Model) tree comparisons and edit distances for web page data extraction, applying tags from a known page to similar pages.

Cloud AI services also allow for the composition of custom models and the use of confidence scores to route or determine the reliability of extraction results.

For integrity verification, existing solutions present certain limitations. Blockchain systems, while robust, often introduce unacceptable latency and computational overhead for high-frequency transactional workflows. Additionally, blockchain systems impose unsustainable environmental costs, consuming 10,000 to 200 billion times more energy per event than required for cryptographic verification alone. This environmental impact conflicts with corporate ESG (Environmental, Social and Governance) commitments, carbon neutrality goals, and emerging regulations on computational sustainability. Conventional TSP relies on centralized TSAs and typically timestamps individual data items rather than providing an integrated, rolling verification for an entire sequence of workflow events. HSM audit logs secure HSM operations but are not designed to compute and embed verifiable digests of external application-level workflow event sequences. While rolling hashes and append-only logs are known concepts, there remains a need for a system that specifically combines low-latency, decentralized verification of ordered workflow events by using a rolling digest that is uniquely salted with high-precision timestamps from the events themselves, with the computation being securely and performantly offloaded to an HSM.

Systems for append-only logs and transparency logs, such as those using Merkle trees or append-only authenticated dictionaries (AADs), aim to provide verifiable integrity and efficient proofs for log data. These are generally focused on ensuring that data, once written, cannot be altered or deleted without detection, and allow for efficient verification of log contents.

For document extraction, while various systems use templates, AI, or a combination, a gap exists for a highly adaptive system that efficiently balances the speed of template-based processing with the flexibility of AI. Many template systems are fragile or require manual template creation/updates. AI systems can be slow and expensive. Moreover, GPU-based AI systems impose substantial environmental costs, consuming 300-400 W continuously during inference, requiring specialized cooling infrastructure, and contributing significantly to data center carbon emissions. The energy intensity makes large-scale deployment incompatible with corporate sustainability mandates and emerging regulations on computational emissions. There is a need for a system that employs a specific, efficient structural layout hash (derived from visual features like edge density) for rapid routing and as a key for a template cache, coupled with a robust mechanism for automatic generation and caching of new extraction templates based on high-confidence outputs from an AI model 168 like a fallback AI model. This creates a continuously-learning system that minimizes reliance on the slower AI path over time for recurring layouts.

There is a need for systems that (1) provide low-latency, decentralized event sequence verification with minimal audit-log dependency, specifically using timestamp-salting within a rolling digest computed by an HSM; and (2) adaptively extract structured data from electronic documents by learning and caching templates for recurring layouts, using a structural layout hash for routing and automatic template generation from AI outputs.

This disclosure introduces a number of terms. The following are various definitions of terms introduced and used herein: A "high-precision timestamp" can be a timestamp with µs-level resolution or finer. Other resolutions are contemplated as well. A "rolling digest" can refer to a cumulative cryptographic hash that updates incrementally as new events are added, where each update incorporates a salt derived from the event's high-precision timestamp. A "layout vector" can be a fixed-dimensional numerical representation of document structure created by overlaying a grid on an edge-detected image and calculating edge density per cell. For a 32×32 grid, this creates a 1024-dimensional vector. A "LayoutHash" or "LayoutHash" can be a SHA-256 or equivalent hash of a layout vector computed from the spatial structure (specifically, edge density over a grid) of a document image.

A "confidence threshold" can represent a numeric score (e.g., between 0 and 1) indicating the AI model's certainty in its extraction results, used to trigger new template generation. The default value can be >0.9, but other values above or below this are within the scope of this disclosure. A "binarization" process can be a process of converting a grayscale or color image into a binary image, where each pixel is represented by only two possible values, typically black (0) and white (1).

A "fast path" can refer to a rule-based, CPU-efficient extraction using pre-cached templates identified by the LayoutHash. A "fallback path" refers to an AI-driven extraction using transformer or multimodal models, typically requiring GPU resources but could include other types of resources, for documents whose LayoutHash is not found in the template cache. The concept of "edge density" relates to the proportion of pixels classified as edges within a grid cell after edge detection in a document. Values range from 0.0 (no edges) to 1.0 (all pixels are edges).

An "extraction schema" refers to a definition of expected fields and data types for a document class. The extraction schema is used to guide AI extraction and validate template outputs.

The concept of "computational sustainability" refers to the practice of designing and operating computing systems to minimize environmental impact while maintaining required functionality. "Energy-proportional verification" can be achieved by a verification system where energy consumption scales linearly with transaction volume, without the exponential growth seen in blockchain mining difficulty adjustments.

The concept of "carbon-neutral cryptography" relates to cryptographic operations with sufficiently low energy consumption to be offset through reasonable carbon reduction or capture mechanisms. "Power usage effectiveness (PUE)" can refer to a ratio of total facility power to IT equipment power. Lower is better; 1.0 is perfect. "Thermal design power (TDP)" relates to the maximum heat generation of a processor under load, measured in watts.

The concept of "scope two emissions" relates to indirect greenhouse gas emissions from purchased electricity, which is critical for corporate carbon accounting. "Edge Computing" relates to data processing data near the source rather than in centralized data centers, often with strict power constraints. The concept of "embodied carbon" relates to $CO_2$ emissions from manufacturing, transporting, and disposing of hardware. A "GPU duty cycle" can relate to a percentage of time GPU is actively processing versus idle, affecting power consumption and hardware lifespan.

The cryptographic integrity verification and adaptive AI document extractor systems disclosed herein may be implemented independently. Each respective system offers distinct technical advantages. If used together, they form an integrated platform for both workflow integrity and document automation.

Figure 1B:
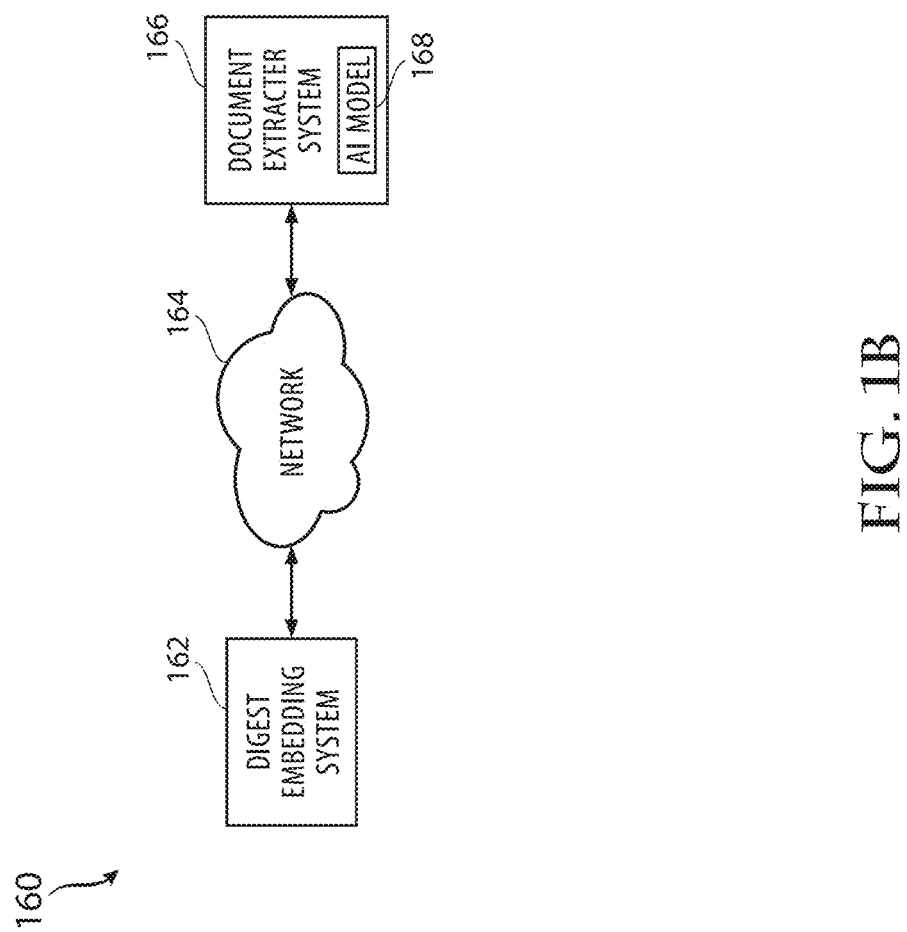
FIG. 1B illustrates a digest embedding system and a document extraction system, in accordance with some examples.

FIG. 1B illustrates the basic components disclosed herein in a network environment 160 that includes the two systems introduced above. A digest embedding system 162 can communicate through a network 164, such as the Internet or any type of network, with a document extractor system 166. The document extractor system 166 can also be characterized as an adaptive AI document extractor system. An AI model 168 can be included, which is trained to generate classifications or outputs as part of the process of adaptive AI document extraction. The network environment 160 can also represent any cloud-computing environment in which computer systems are connected via the cloud and operated by any known cloud operator such as Google or Amazon.

Accordingly, this disclosure introduces two complementary systems for secure and scalable workflow processing, designed to address the aforementioned issues.

A first system is the digest embedding system 162. The digest embedding system 162 can be configured to implement a method for integrity verification of workflow event sequences. Events are logged in an append-only data store, each tagged with a high-precision timestamp (defined as ≥1 µs resolution). A rolling SHA-256 digest is computed per workflow instance using the prior digest, a serialized event representation, and a salt derived directly from the event's high-precision timestamp. The computation is preferably performed within an HSM. The terminal digest or terminal digest value is embedded into a message or data structure associated with the instance. Recipients verify the sequence by recomputing the digest from local logs. This allows<10 ms verification without centralized query dependency or blockchain overhead.

The digest embedding system 162 achieves this performance while consuming less than 0.00001 kWh per event—a reduction of more than 99.97% compared to the most efficient blockchain alternatives-making it suitable for organizations with sustainability mandates and carbon reduction targets.

The document extractor system 166 can be characterized as an adaptive AI document extractor system that can implement a document processing pipeline using a LayoutHash computed from edge density vectors over an N×N grid (e.g., non-limiting examples include 32×32 or 64×64 or equivalent), subsequently hashed via SHA-256, BLAKE2 or equivalent cryptographic algorithm to route documents. If a match for the LayoutHash is found in a NoSQL (no structured query language) template cache, CPU-efficient extraction rules (e.g., bounding boxes, regex) defined in the cached template are applied. If unmatched, the document is routed to an AI model 168 like a fallback AI model (e.g., a multimodal transformer-based model), which extracts fields and returns confidence scores.

The adaptive AI document extractor is distinguished from prior art in the following ways. First, the approach uses a specific LayoutHash for efficient cache keying and routing. While document layout analysis is known in general, the system disclosed herein computes a specific LayoutHash. The cryptographic hash function Secure Hash Algorithm 256-bit (SHA-256) is one example of a hash function that can be applied to an edge density vector from a grid overlay. The LayoutHash serves not just for general classification, but as a highly efficient and robust direct key for a template cache and for deterministic routing between a fast, rule-based path and an AI fallback path. This is more direct than general similarity ranking or DOM (Document Object Model) tree comparisons.

Next, the system uses automatic template generation from high-confidence AI output. Many systems use pre-defined templates or select from existing ones. One novelty disclosed herein is the automatic generation and caching of new extraction templates when the fallback AI model processes a previously unseen layout with high confidence (e.g., >0.9). The approach creates a self-improving loop where the system learns new layouts encountered by the AI model, progressively reducing the need to invoke the expensive AI path for those layouts in the future. This is distinct from merely caching AI prompts/responses or requiring manual template creation.

Another novelty relates to the use of an integrated hybrid system with adaptive learning. The system tightly integrates a fast, CPU-based template path with a GPU-based AI fallback path, but one element is the adaptive learning mechanism. The system doesn't just use AI as a fallback; it uses the AI's successful outputs (above a confidence threshold) to create new templates for the faster processing path. The continuous learning and template generation based on AI confidence is a more advanced form of adaptation than general adaptive OCR (optical character recognition) or simple feedback mechanisms.

The disclosed approach applies robust handling of diverse formats via a layout fingerprint. The layout hash, being derived from visual edge detection on a (normalized) image, provides a consistent structural fingerprint applicable across various document formats (PDF, TIFF, PNG, JPEG or equivalent), unlike methods tied to specific document object models (e.g., DOM for HTML).

The disclosed approach provides environmental sustainability through adaptive learning. Unlike pure AI systems that process every document through power-intensive GPU inference (300-400 W), the disclosed concepts apply adaptive template generation to create a progressively more efficient system. After learning common layouts, 70-95% of documents process through CPU-based paths (~5 W), reducing energy consumption by >90% while maintaining accuracy. The fundamental architectural advantage enables sustainable document processing at scale.

The following is example computer code illustrating a prompt structure for a request or set of instructions to provide to an AI model:

```
{
  "contents": [
    {
      "role": "user",
      "parts": [
        {
          "text": "Extract structured data from this trade confirmation document. I need the following fields in valid JSON format:\n\n- trade_date\n- settlement_date\n- security_id\n- quantity\n- price\n- total_amount\n- counterparty_name\n- transaction_id\n\nEnsure you return only valid JSON with these fields. Include a confidence score (0.0-1.0) for each extracted field."
        },
        {
          "inline_data": {
            "mime_type": "image/png",
            "data": "[BASE64_ENCODED_DOCUMENT_IMAGE]"
          }
        }
      ]
    }
  ],
  "generationConfig": {
    "temperature": 0.2,
    "responseType": "application/json"
  }
}
```

If an aggregate confidence exceeds a defined threshold (e.g., >0.9), a new extraction template, keyed by the document's layout hash, is automatically generated from the AI's successful extraction and cached. Over time, the system reduces fallback AI usage by >70% for recurring document layouts. The adaptive learning approach reduces energy consumption by more than 90%, from ~40,000 kWh per million documents for pure GPU processing to ~2,000 kWh per million documents, while maintaining extraction accuracy. The system enables document processing within carbon-neutral operational frameworks.

These systems can be implemented in any computing system or network, including implementation across common cloud environments (e.g., GCP, AWS, Azure or equivalent), leveraging services such as HSMs, serverless compute, and managed databases.

Figure 2:
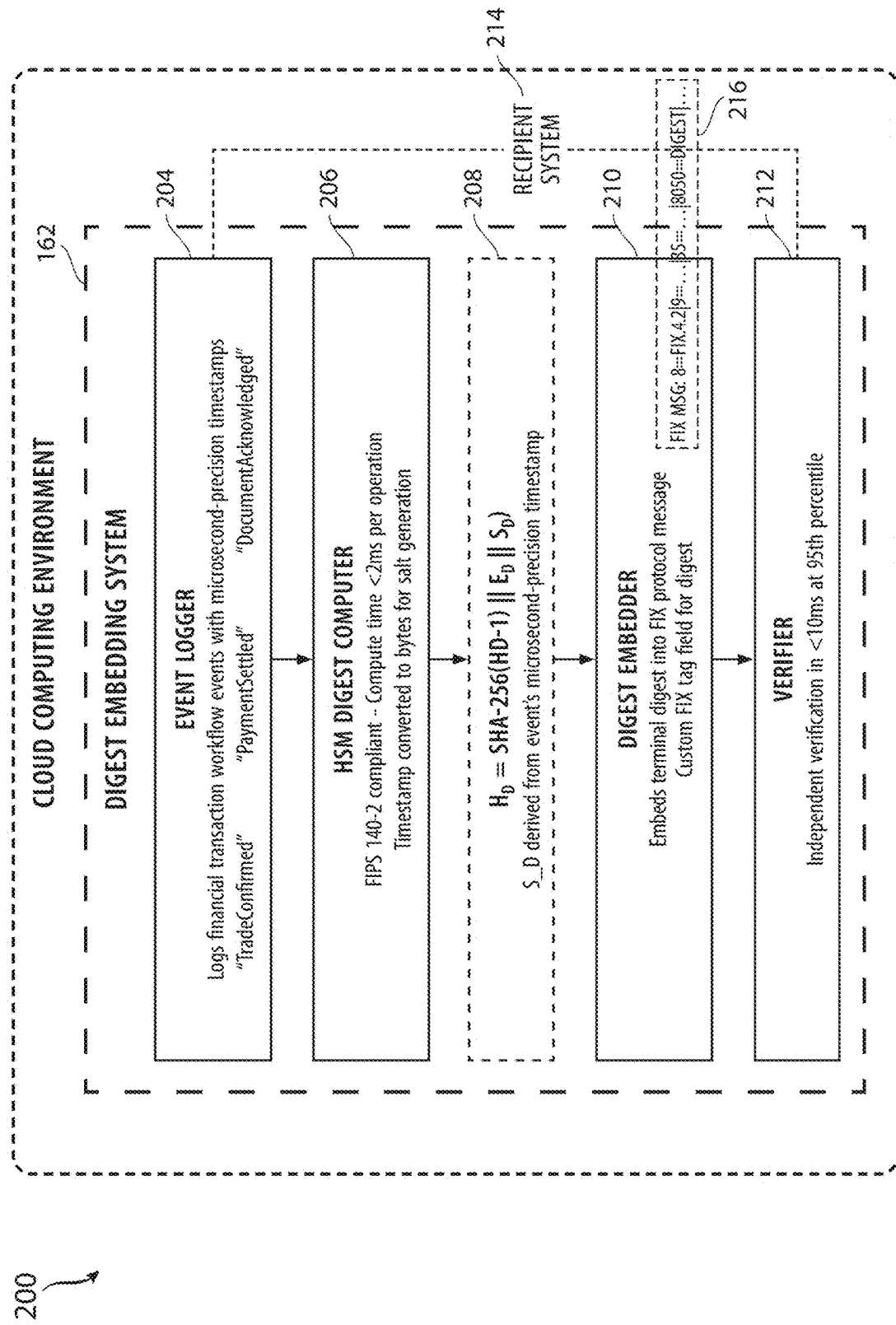
FIG. 2 is a block diagram illustrating an example cloud-computing environment, in accordance with some examples.

FIG. 2 is a block diagram illustrating an example of a cloud-computing environment 200. The cloud computing environment 200 can include the digest embedding system 162. An event logger 204 can log events such as, for example, events in a financial transaction workflow with timestamps. The timestamps may be with µs precision. For example, an event may be "TradeConfirmed", "PaymentSettled" or "DocumentAcknowledged". In general, the event may refer to any event for any type of workflow. Each workflow instance (e.g., financial trade, medical event, shipment) can be tracked via a sequence of "events" logged to a structured, append-only data store (e.g., PostgreSQL, BigQuery). Each event includes one or more of: a workflow InstanceID, an eventID, a timestamp (with, for example, µs precision unix epoch time), an EventType and a serialized payload (e.g., JSON (JavaScript Object Notation), SHA-256 or equivalent hash of content). The event logger 204 locs events with µs precision in some cases, although longer time-frames are possible.

A digest computer 206 can be, for example, a hardware security module (HSM) that provides secure environments for cryptographic operations and key management. HSMs often feature their own secure audit logging capabilities, where events internal to the HSM (like key generation or usage) are logged and cryptographically protected (e.g., HMACed or signed). The logs are typically used to audit the HSM's own activities. FIPS (Federal Information Processing Standard) 140-2 represents an example standard for validating the security of such cryptographic modules. Other standards may be used as well. The digest computer 206 may also convert the timestamps to bytes for salt generation. Salt generation in cryptography refers to the process of creating a random value (a "salt") that is combined with data-typically a password or passphrase-before it is processed by a hash function. In some aspects, the compute time may be less than 2 ms per operation that is performed by the digest computer 206.

Block 208 represents the application of a rolling digest, which in some cases can occur or be performed in an HSM or the digest computer 206. For example, a rolling SHA-256 digest Hp is computed iteratively using the previous digest $H_{D-1}$ and can be computed per workflow instance:

$H_D$=SHA-256 ($H_{D-1}\|E_D\|S_D$), in which Hp represents the current digest (D-th digest in the sequence), a value Sp is a salt derived from an event's timestamp, $E_D$ represents the event (the D-th event in the sequence) and D-1 represents a previous digest. In other words, a rolling SHA-256 digest is computed per workflow instance using the prior digest (i.e., D-1), a serialized event representation (i.e., $E_D$), and a salt (i.e., $S_D$) derived directly from the event's (high-precision) timestamp.

The mathematical operator∥ represents a concatenation of the values and ( ) is a function that converts the event into a standardized string or binary representation.

The formula above describes how each new digest in the sequence is computed by taking the SHA-256 hash of the concatenation of three elements: the previous digest value, the serialized representation of the current event, and a salt derived from the event's high-precision timestamp.

The formula establishes a cryptographic chain where each new digest depends on all previous events in the sequence, providing tamper resistance and verification capabilities for the entire workflow history.

The computation is offloaded to a FIPS 140-2-compliant HSM for performance and tamper resistance. HSM latency is typically <1 ms per operation. The use of the event's own high-precision timestamp as a salt in each step of the rolling digest is a useful feature.

A digest embedder 210 embeds the terminal digest into a protocol message using a protocol such as the FIX (Financial Information Exchange) protocol. In some cases, a FIX tag field for the digest created is used in the message. The terminal digest or terminal digest value is embedded into a message or data structure associated with the workflow instance. Recipients verify the sequence by recomputing the digest from local logs. The approach allows or enables a<10 ms verification without centralized query dependency or blockchain overhead. An example embedded digest 216 is shown as: FIX MSG: FIX.4.2|9= . . . |36= . . . | 8050=DIGEST| . . .

When a workflow reaches a completion or checkpoint state, the final digest is embedded into a message (e.g., FIX, JSON, XML (extensible Markup Language) or equivalent) for downstream transmission. The message is sent over secure protocols (e.g., TLS 1.3, HTTPS) or stored in tamper-evident logs.

The system achieves this performance while consuming less than 0.00001 kWh per event—a reduction of more than 99.97% compared to the most efficient blockchain alternatives. The new architecture makes it suitable for organizations with sustainability mandates and carbon reduction targets.

A verifier 212 can be an independent system that provides verification in <10 ms at a 95th percentile, for example. The document extraction system 166 is an example of a verifier 212. Recipient system 214 recomputes the digest from locally stored events (assuming they have access to the same sequence of events and their precise timestamps) and compares it to the embedded digest. This cryptographic verification avoids centralized audit log queries and can be performed in <10 ms.

When a recipient system 214 such as document extractor system 166 receives an electronic message containing an embedded terminal digest, the verification process follows these steps: (1) document extractor system 166 extracts the embedded terminal digest ($TD_{received}$) from the message; (2) document extractor system 166 retrieves the sequence of workflow events for the same WorkflowInstanceID from local event logs; (3) document extractor system 166 initializes verification with $H_0$=empty or predefined seed value; (4) document extractor system 166, for each event $E_i$ in chronological order: (a) extracts the high-precision timestamp $T_i$; (b) derives salt $S_i$ from timestamp $T_i$ using the same algorithm as the originating entity; (c) serializes event $E_i$ using the identical serialization method; and (d) computes $H_i$=SHA-256 ($H_{(i-1)}\|$ Serialize ($E_i$)$\|S_i$).

Next, in step (5), document extractor system 166 compares computed terminal digest $H_{final}$ with $TD_{received}$; (6)

document extractor system 166, if $H_{final}=TD_{received}$, determines that verification succeeds; otherwise, determines that an integrity violation is detected.

The document extractor system 166 can perform multi-entity verification. When the digest embedding system 162 and document extractor system 166 are distinct, the document extractor system 166 must have access to (1) the same event sequence (obtained through secure replication or agreed-upon logging); (2) identical timestamp precision and salting algorithms; and (3) the same serialization methods for events.

The cryptographic property ensures that any modification to events, such as an event sequence or event timestamps, will result in a different terminal digest. This enables detection of integrity violations across entity boundaries.

There are a number of environmental benefits to the disclosed approach. The approach reduces the carbon footprint by 99.97-99.99% compared to blockchain alternatives. The disclosed approach enables cryptographic verification within corporate carbon budgets and supports various reporting and environmental compliance requirements. The approach also eliminates the need for dedicated mining infrastructure or continuously running validator nodes.

The digest embedding system 162 (also known as the timestamp-salted digest embedding system) offers several distinctions from the known prior art. One novelty relates to the specific use of a timestamp as salt in rolling digest. While rolling hashes are known, the present disclosure uniquely employs the high-precision (i.e., μs-level or other high-precision level) timestamp of each individual workflow event directly as a salt ($S_D$) in the iterative computation of the rolling digest ($H_D$-SHA-256 ($H_{D-1}$∥Serialize ($E_D$)∥$S_D$)). The tight coupling of the event's precise time with its content in the digest chain provides a stronger, more granular proof of sequence and timing integrity than general timestamping.

Another novelty relates to decentralized verification without blockchain overhead. Unlike blockchain timestamping, which often incurs latency and cost, the present system achieves very low verification times (<10 ms) and avoids the complexities of distributed consensus mechanisms or public ledgers. Any recipient possessing the (locally accessible) event sequence performs verification, making it highly efficient for transactional systems.

The approach provides enhanced functionality over the conventional time stamp protocol (TSP) (e.g., RFC 3161). TSP typically timestamps a single data item via a centralized time stamp authority (TSA). One embodiment, in contrast, creates a verifiable chain for an entire sequence of workflow events specific to a workflow instance. The verification is decentralized and the timestamp is an integral part of each step in the digest calculation, not merely an external attribute added at the end.

Another aspect of this disclosure is application-level event integrity via HSM. While HSMs have internal audit logs for their own operations and are FIPS 140-2 compliant, the systems disclosed herein utilize the HSM's cryptographic capabilities to compute the rolling digest for external, application-level workflow events. This offloads the sensitive computation, ensuring both its integrity and performance, which is distinct from merely logging HSM internal activities.

The disclosed systems focus on workflow event sequences. Unlike general append-only log structures or AADs (additional authenticated data) that provide integrity for stored data, some aspects of this disclosure are specifically tailored for verifying the ordered integrity of dynamic workflow event sequences as they are generated and transmitted, with an emphasis on low-latency verification by downstream systems.

The disclosed systems provide for improved environmental sustainability and energy efficiency. Unlike blockchain systems that require continuous operation of mining hardware or validator nodes consuming 0.03-2,000 kWh per transaction, the digest embedding system 162 leverages existing HSM infrastructure with energy consumption of approximately 0.00001 kWh per event. This represents a fundamental architectural advantage: achieving cryptographic integrity without the environmental overhead of distributed consensus mechanisms. The system supports organizational sustainability goals while maintaining the same level of tamper-evidence as blockchain alternatives.

Figure 3:
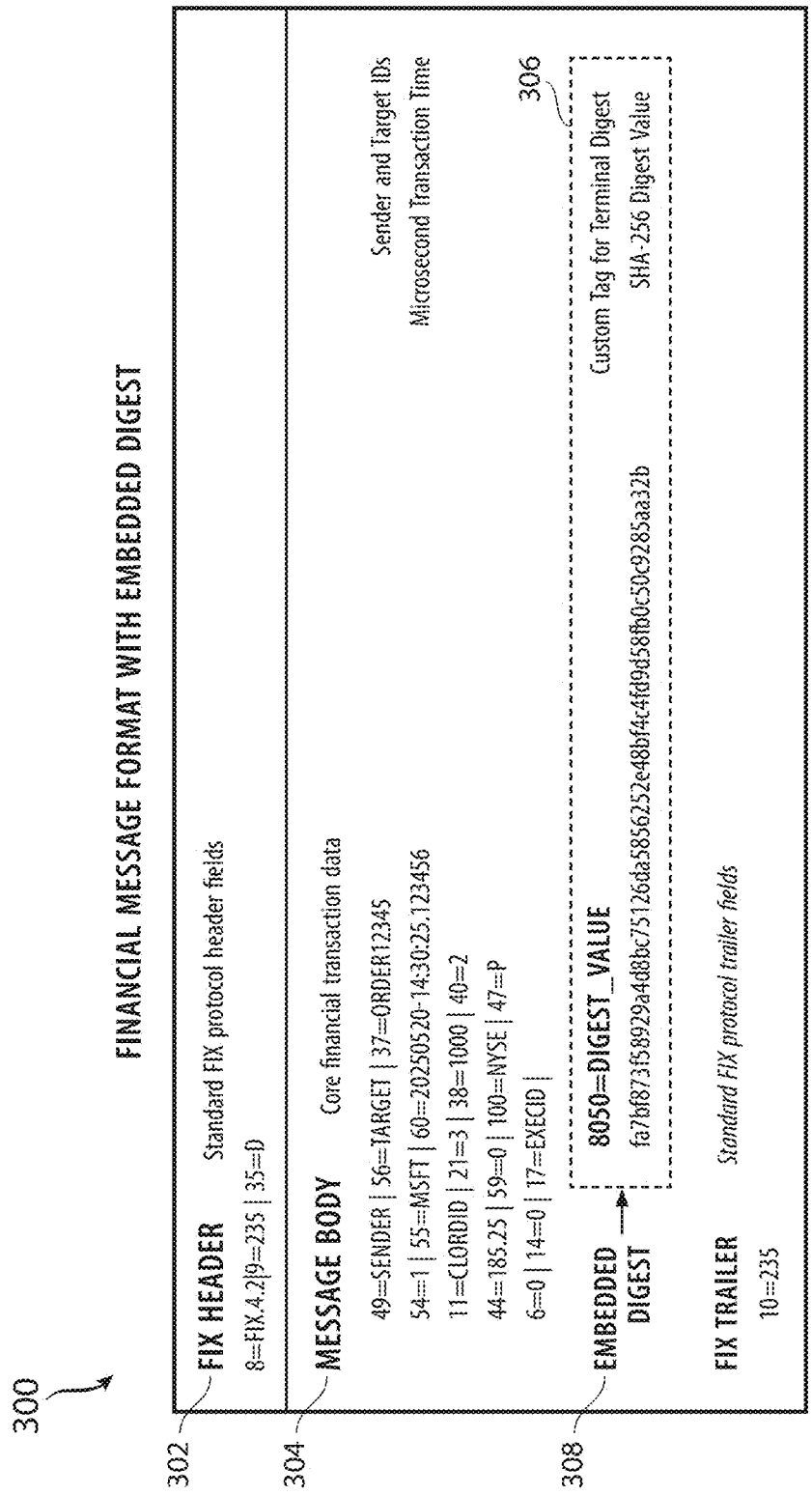
FIG. 3 is a block diagram illustrating an example financial message format with an embedded digest, in accordance with some examples.

FIG. 3 is a block diagram illustrating an example financial message format 300 with an embedded digest. An example FIX protocol message includes an embedded terminal digest 306 in field 8050. The pipe symbols (|) represent FIX field separators according to ASCII 01. A FIX header 302 can include standard FIX protocol header fields or may include new fields used for the embedded digest.

The example in FIG. 3 relates to financial transaction data and the message body 304 can include, by way of example, sender data, target data, order data, exchange data (i.e., the New York Stock Exchange (NYSE)), execution data and amounts. The embedded terminal digest 306 is shown for the event, which is a custom tag for a terminal digest. Shown is an example SHA-256 digest value illustrating a terminal digest representing the last digest in a series of events.

In the FIX protocol, the header is mandatory and always comes first. Example FIX values include: 8=BeginString-FIX version (e.g., FIX.4.2); 9=BodyLength-Number of bytes in the message body (from tag 35 to just before tag 10); 35=MsgType-Type of message (e.g., D for New Order-Single). FIG. 3 illustrates an example financial message, but the principle disclosed applies to any type of message or protocol. A FIX trailer 308 is also shown with standard FIX protocol trailer fields.

Figure 4:
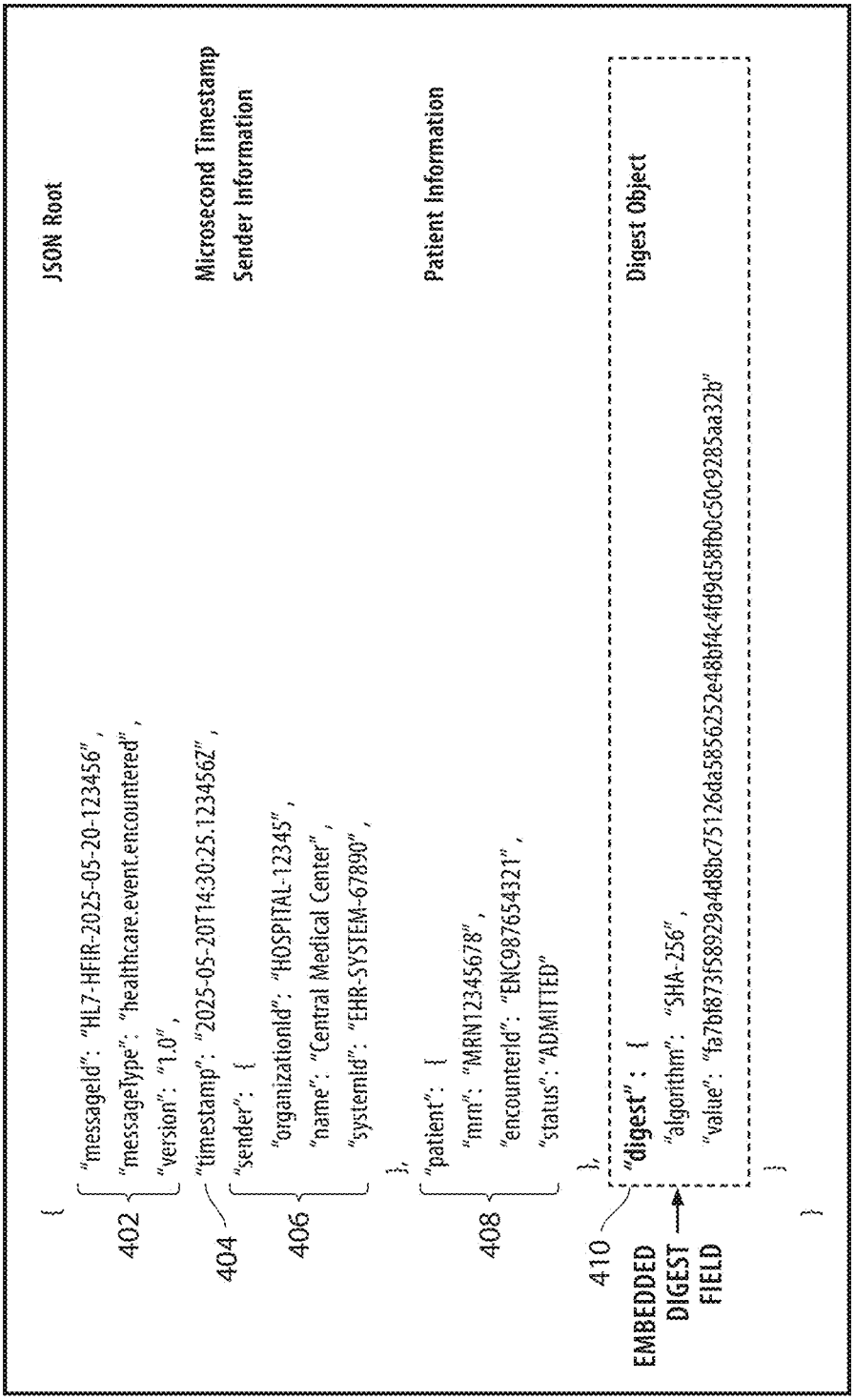
FIG. 4 is a block diagram illustrating a JSON structure with an embedded digest field, in accordance with some examples.

FIG. 4 is a block diagram illustrating a JSON structure 400 with an embedded digest field for healthcare messages, in accordance with some examples. The JSON structure 400 includes the embedded digest 410 for temper-evidence integrity verification. The JSON structure includes a JSON root 402, a timestamp 404, sender information 406, patient information 408 and a digest object 410. The message in this example relates to patient information and patient status. Still, the JSON structure 400 can, of course, apply generally to any message that receives an embedded digest object 410. The digest object 410 includes a reference to the algorithm used ("SHA-256" in this example) and a value for the embedded digest as shown. The JSON structure 400 is used with the digest object 410 or the embedded digest for tamper-evidence integrity verification as disclosed herein.

Figure 5:
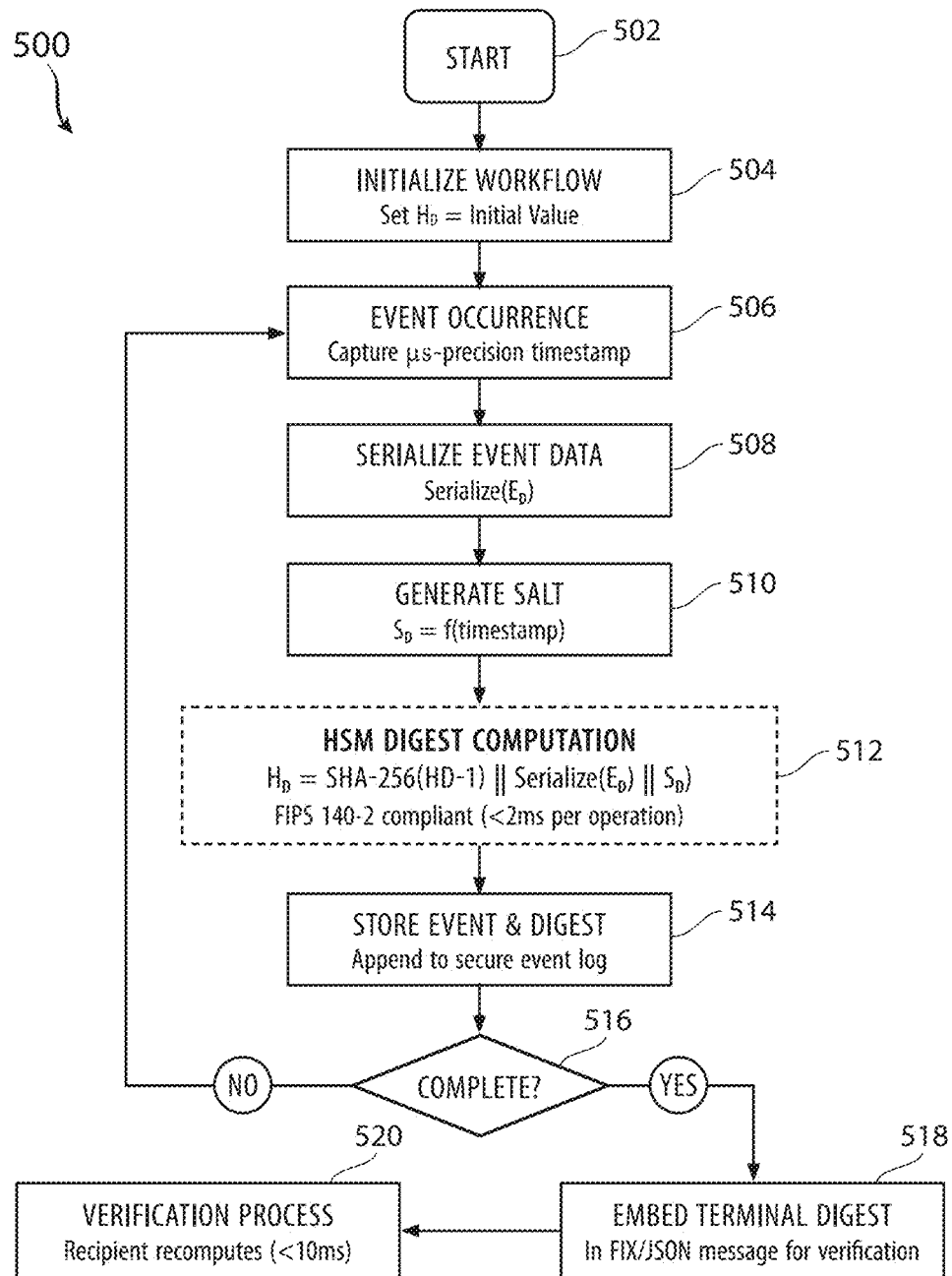
FIG. 5 is a block diagram illustrating a flowchart of rolling digest computation using timestamp-based salting, in accordance with some examples.

FIG. 5 is a block diagram illustrating a flowchart of rolling digest computation 500 using timestamp-based salting, by some examples. At block 502, the process begins, where each event includes an event type, a timestamp with μs precision, and an event payload. At block 504, the workflow is initialized by, for example, setting a value $H_1$=initial value. Each workflow instance has a unique identifier.

At block 506, the even occurrence is captured via a capture of the timestamp. The timestamp can be at different precision values, such as μs-precision. At block 508, event data is serialized via a command serialize ($E_D$). At block 510, a salt is generated $S_D$=f (timestamp). At block 512, a digest is computed, where an HSM or other system can be used to provide tamper resistance and high performance. At block 514, the event and digest are stored and the system appends the data to a secure event log. Block 516 determines whether the process is complete, meaning that each event is processed. If yes, block 518 causes a terminal digest to be embedded in a FIX/JSON message for verification. Block 520 represents implementing the verification process by the recipient system 214, recomputing the digest.

If, at block 516, the process is not complete, then the flow continues to the next event at block 506. FIG. 5 thus illustrates the process of the rolling digest computation using timestamp-based salting.

Figure 6:
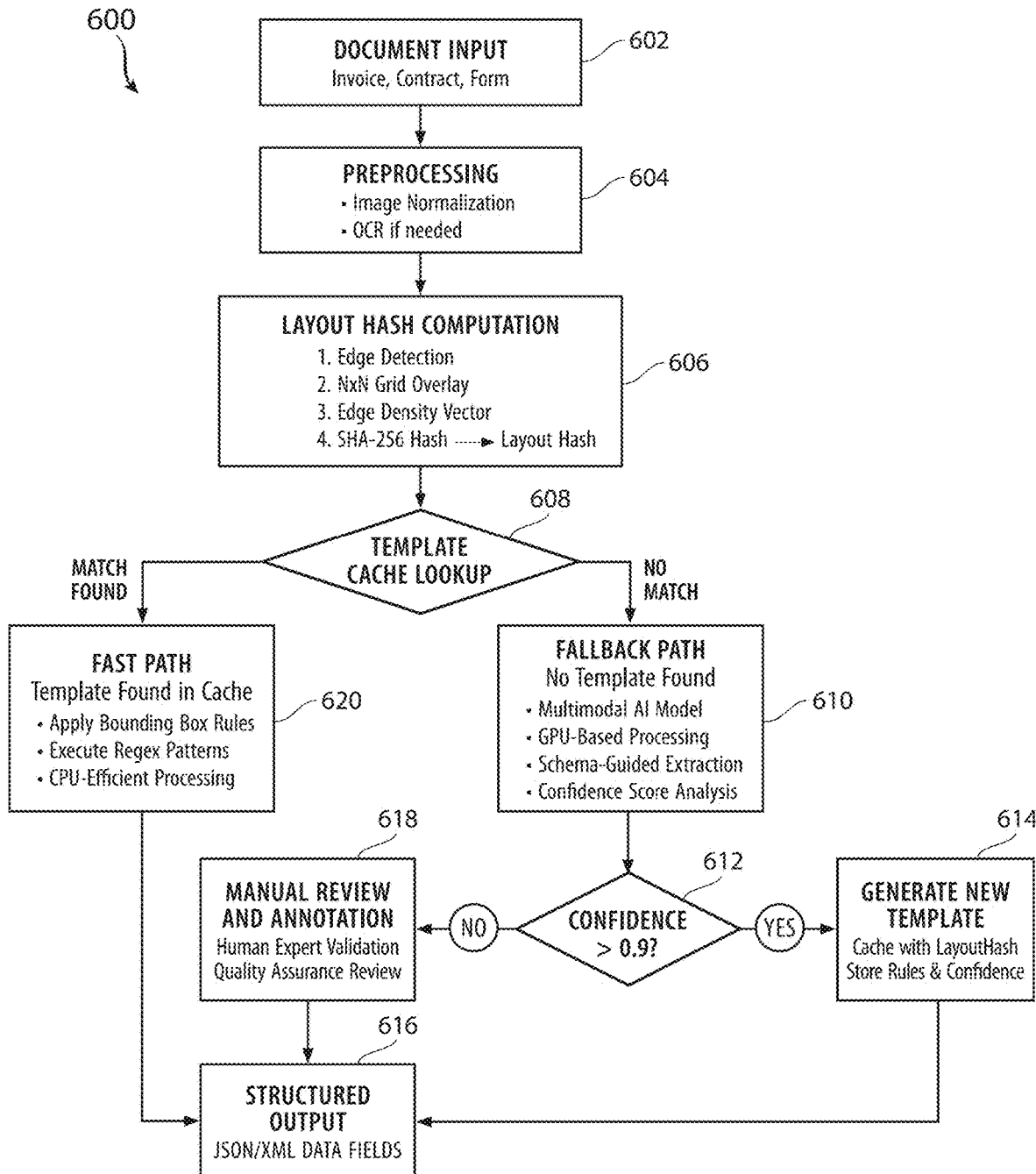
FIG. 6 is a block diagram illustrating an example document processing pipeline with layout hash routing, in accordance with some examples.

FIG. 6 is a block diagram illustrating an example document processing pipeline 600 with layout hash routing, according to some aspects of this disclosure. A document can be input from an API or from file listeners. At block 602, the document is ingested into the system. The file can be of any format, such as PDF, TIFF, PNG, JPEG, or any other format. At block 604, the file is preprocessed, which can include operations like normalization (e.g., 150 DPI or higher), optical character recognition (e.g., Tesseract, AWS Textract or equivalent), and/or other operations if needed. Binarization, if needed, can be applied. Documents can be uploaded via application program interfaces (APIs) or file listeners in formats such as PDF, TIFF, PNG, JPEG or equivalent.

At block 606, a layout hash computation is performed in which one or more parameters or considerations are used to generate a layout hash. For example, edge detection can be performed for the edges of images, or the edges of the document can be determined. Edge detection can apply to a normalized document image, if it is normalized. The edge detection can obtain edge detection data. An edge density vector of the edge detection data can be determined. A grid overlay can be applied to the edge detection data, such as, for example, a 32×32 grid or other grid size. The grid can be a fixed-size grid for the edge-detected image. The system can generate the edge density vector by computing edge density values for each grid cell (e.g., a 1024-dimensional vector for a 32×32 grid or equivalent). A hash can be applied, such as a SHA-256 hash. At block 608, the system performs a template cache lookup using the layout hash as a key.

The system can hash the edge density vector using a cryptographic hash function (e.g., SHA-256) to produce a layout hash. The layout hash serves as a unique fingerprint of the document's visual structure.

At block 608, the system performs a template cache lookup. If the computed layout hash exists as a key in a template cache (e.g., a NoSQL database like MongoDB or DynamoDB), the system implements a fast path process 620 and applies the associated extraction rules (e.g., bounding boxes and regex patterns for specific fields) found in the cached template. The fast path utilizes CPU-efficient rule-based processing. Otherwise, the document is routed to a fallback path process 610 if no match is found. The fallback path process 610 uses an AI model (e.g., an LLM or a multimodal transformer model on platforms like Vertex AI or SageMaker). In the fallback path process 610, the AI model receives the text (which can be obtained from optical character recognition) and/or document image, along with a schema or prompt defining the desired data fields. The AI model extracts the data and returns it along with confidence scores for each field or for the document as a whole. If the aggregate confidence score (or individual scores for critical fields) exceeds a predefined threshold (e.g., >0.9) via a confidence determination 612, a new extraction template is automatically generated 614. The new template includes the extraction rules (e.g., derived bounding boxes, identified regex patterns from the AI's understanding) and is stored in the template cache, indexed by the document's layout hash. When the confidence is equal to or less than 0.9, block 618 indicates that a manual review and annotation can occur, where a human expert validates the data and a quality assurance review occurs. Block 616 references the structured output from both the fast path process 620 and the fallback path process 610. Other thresholds can be applied as well, and the confidence level being defined at 0.9 is by way of example only.

Benefits of this approach include a reduction of GPU cost and inference latency (e.g., from ~4 s for AI to ~0.3 for cached template), and increased extraction success rate for recurring layouts by learning them. The fallback path process 610 allows adaptive learning and improvement with minimal human input, as new templates are automatically created for previously unseen but consistently structured documents.

Figure 7:
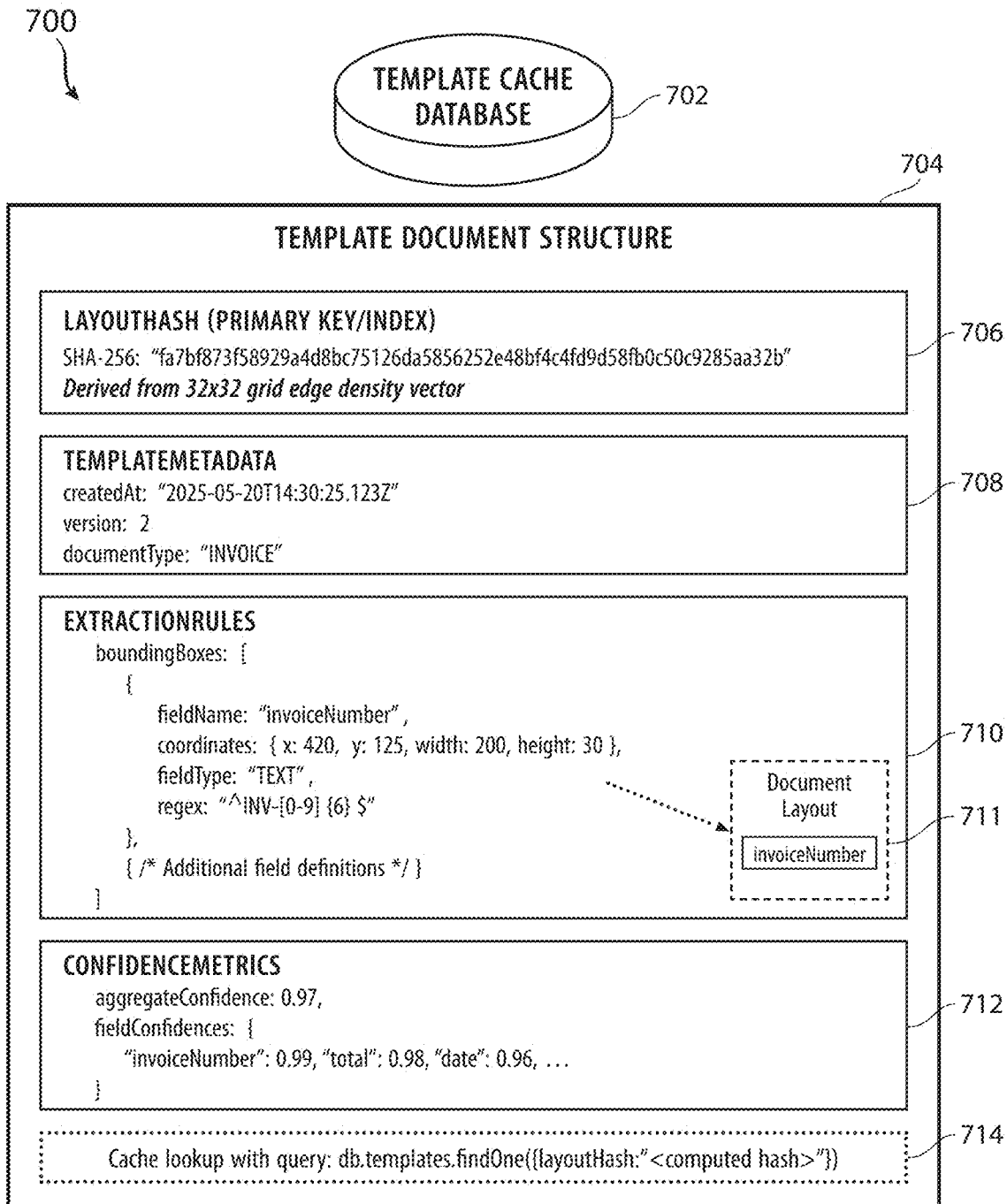
FIG. 7 is a diagram illustrating an example template cache schema, in accordance with some examples.

FIG. 7 is a diagram illustrating an example template cache schema 700, following some examples. In one example, FIG. 7 shows the schema for a NoSQL template cache schema including layout hash, bounding box rules and confidence scores. A template cache database 702 can store templates in a template cache schema. The schema can include a template document structure 704 that includes a unique key for each template in the LayoutHash 706. In some aspects, the LayoutHash 706 can be derived from an N×N grid edge density vector.

The following example computer code illustrates complex extraction with schema enforcement:

```
{
  "contents": [
    {
      "role": "user",
      "parts": [
        {
          "text": "Extract the following data from this financial document according to this JSON schema: \n\n\"""json\n {\n \"type\": \"object\", \n \"properties\": {\n    \"document_type\": {\"type\": \"string\", \"enum\": [\"trade_confirm\", \"term_sheet\", \"settlement_notice\"]}, \n \"transaction\": {\n    \"type\": \"object\", \n    \"properties\": {\n    \"id\": {\"type\": \"string\"}, \n    \"trade_date\": {\"type\": \"string\", \"format\": \"date\"}, \n \"settlement_date\": {\"type\": \"string\", \"format\": \"date\"}\n    }, \n    \"required\": [\"id\", \"trade_date\"]\n    }\n \"security\": {\n    \"type\": \"object\" \n    \"properties\": {\n    \"id\": {\"type\": \"string\"}, \n    \"type\": {\"type\": \"string\"}, \n \"description\": {\"type\": \"string\"}\n    }\n    \"required\": [\"id\"\n    }\n    \"pricing\": {\n    \"type\": \"object\",\n    \"properties]\": {\n    \"quantity\": {\"type\": \"number\"}, \n \"price\": {\"type\": \"number\"},\n    \"currency\": {\"type\": \"string\"}, \n    \"total\": {\"type\": \"number\"}\n    },\n    \"required\": [\"quantity\", \"price\"]\n    }, \n    \"parties\":
```

-continued

```
{\n  \"type\": \"array\" \n    \"items\": {\n    \"type\": \"object\",\n    \"properties\": {\n
\"role\": {\"type\": \"string\", \"enum\": [\"buyer\", "seller\", "broker\"]},\n    \"name\":
{\"type\": \"string\"},\n    \"identifier\": {\"type\": \"string\"} \n    },\n    \"required\":
["role\", "name\"\n    }\n    }\n    \"metadata\": {\n    \"type\": {"object\",\n
\"properties\": {\n    \"extraction_confidence\": {\"type\": \"number\", \"minimum\": 0,
\"maximum\": 1}, \n    \"extraction_timestamp\": {\"type\": \"string\", \"format\": \"date-
time\"}\n    }\n    }\n    },\n  \"required": [\"document_type\", "transaction\", "security",
\"pricing\"]\n}\n"\n\nReturn only valid JSON matching this schema with appropriate
confidence scores in the metadata."
    },
    {
      "inline_data": {
        "mime_type": "image/png",
        "data": "[BASE64_ENCODED_DOCUMENT_IMAGE]"
      }
    }
   ]
  }
 ],
 "generationConfig": {
   "temperature": 0.1,
   "responseType": "application/json"
 }
}
```

The LayoutHash 706 can be derived from the grid edge density vector as shown in FIG. 6. Template metadata 708 can include information about the LayoutHash 706, such as The following is an example of computer code that can be used for adaptive bounding box generation for template creation:

```
{
  "contents": [
    {
      "role": "user",
      "parts": [
        {
          "text": "For this financial document, I need to identify bounding box coordinates for
key fields to create a template for future extraction. \n\n1. First identify the document type and
overall structure.\n2. Then locate the following fields in the document and return the
normalized coordinates as [x1, y1, x2, y2] where each value is between 0.0 and 1.0
representing proportional position in the document: \n – trade_date\n – settlement_date\n –
security_identifier\n – quantity\n – price\n – total_amount\n – counterparty_name\n –
transaction_id\n\n3. For each field, also provide a regex pattern that would extract the correct
value from OCR text in that region. \n\nReturn the results as a JSON object with
'document_type', 'layout_confidence', and 'fields' containing the coordinates and regex for
each field."
        },
        {
          "inline_data": {
            "mime_type": "image/png",
            "data": "[BASE64_ENCODED_DOCUMENT_IMAGE]"
          }
        }
      ]
    }
  ],
  "generationConfig": {
    "temperature": 0.2,
    "responseType": "application/json"
  }
}
``` time and date created, version tracking, and its evolution. Other information, such as document type, can be included as well. Extraction rules 710 can be included to outline regions for recognition in a document, such as where bounding boxes are configured and the sizes of different fields. The example shown relates to processing an invoice as part of a workflow. Also shown is a document layout object 711 illustrating where the field for "InvoiceNumber" is on the document. Bounding boxes can map to physical document areas.

The template document structure 704 can also include confidence metrics 712 that contain or reference data about the confidence associated with various templates or fields within a document. For example, the approach might consist of caching only templates with a confidence level greater than 0.9. Shown in the confidence metrics 712 of FIG. 7 are various confidence levels for a field related to "InvoiceNumber", and a field related to "total". And so forth. These fields all show confidence levels above 0.9. An aggregate confidence is shown for the overall template at 0.97. This can mean that the aggregate confidence for the accuracy of obtaining or identifying various fields within a document is sufficiently high to justify caching that particular template. At block 714, reference is made to a cache lookup with query example structure: db.templates.findOne {layoutHash:". The template cache database 702 can thus store templates using the disclosed template cache schema for a NoSQL or any other type of database.

Figure 8:
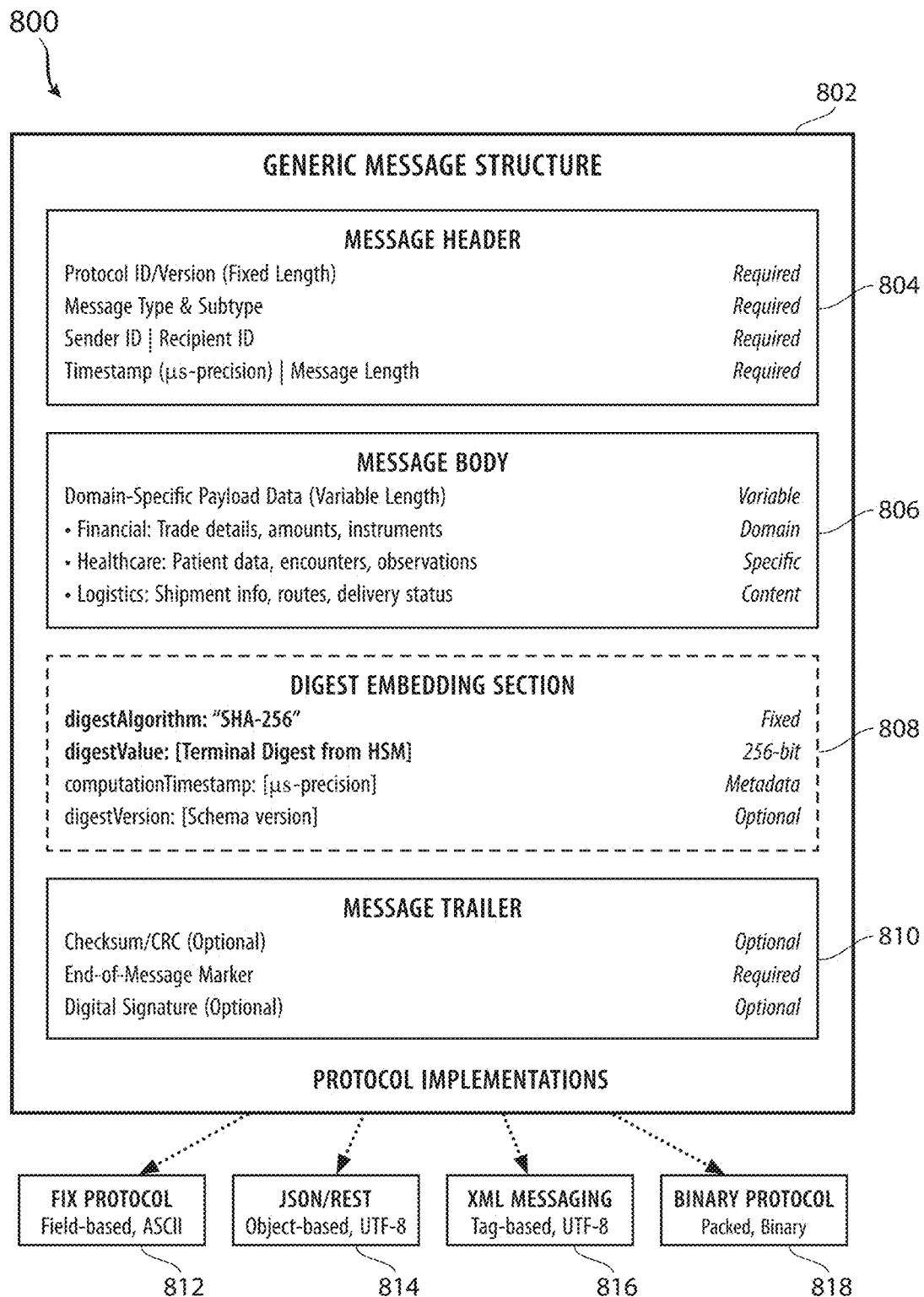
FIG. 8 is a diagram illustrating an example generic message format supporting embedded digests, in accordance with some examples.

FIG. 8 is a diagram illustrating an example of a generic message format 800 supporting embedded digests, in accordance with some aspects of this disclosure. The generic message format 800 provides a non-limitation approach of a generic message format supporting embedded digests. The generic message structure 802 can include a number of different portions. A message header 804 includes fields for message identification, such as a message type, a sender ID, a recipient ID, a timestamp, which can have a certain precision, such as us precision, and a message length. A message body 806 can include variable content based on the use case domain. The examples provided in FIG. 8 include financial, healthcare, logistics, and so forth. Any domain-specific data can be used.

A digest embedding section 808 can include one or more of the core digest information for verification, such as a digest value, the digest algorithm used (i.e., SHA-256), a computation timestamp, and a digest version or schema version.

A message trailer 810 can include message integrity validation data. Such data can include one or more of a checksum, an end-of-message marker, or a digital signature. There may be different protocol implementations of the message trailer 810, such as via a FIX protocol 812 with field-based ASCII data, a JSON/REST protocol 814, which object-based UTF-8 (or Unicode Transformation Format 8-bit) data, XML messaging protocol 816, for tag-based UTF-8 messaging, or binary protocol 818 for packed, binary data.

FIG. 9 is a diagram illustrating an example healthcare message format 900 with an embedded digest field, per some examples. The healthcare message 902 can include a number of different portions. A message header 904 can include basic data like a control ID and a message type. The data can be provided, for example, in HL7 v2.8 format with us precision, which is a Health Level Seven health information exchange standard. A patient identification section 906 can include patient demographics and unique identifiers. A clinical observation section 908 can include lab observations and clinical results. Timestamps can be included.

A healthcare workflow event section 910 can include timestamped events such as when a patient was admitted, when a lab order was placed, and when results will be available or were available. An embedded digest section 912 can include a terminal digest value for a workflow event sequence. This section can include, for example, a SHA-256 terminal digest value. As noted in comment 914, a FHIR-compliant (Fast Healthcare Interoperability Resources-compliant) JSON format can also be supported with a digest in a metadata extension. The digest computation in this case preserves patient privacy while ensuring message integrity. The example of FIG. 9 is a message format that can be generalized from HL7/FHIR) with an embedded digest field represented by the embedded digest section 912.

Figure 10:
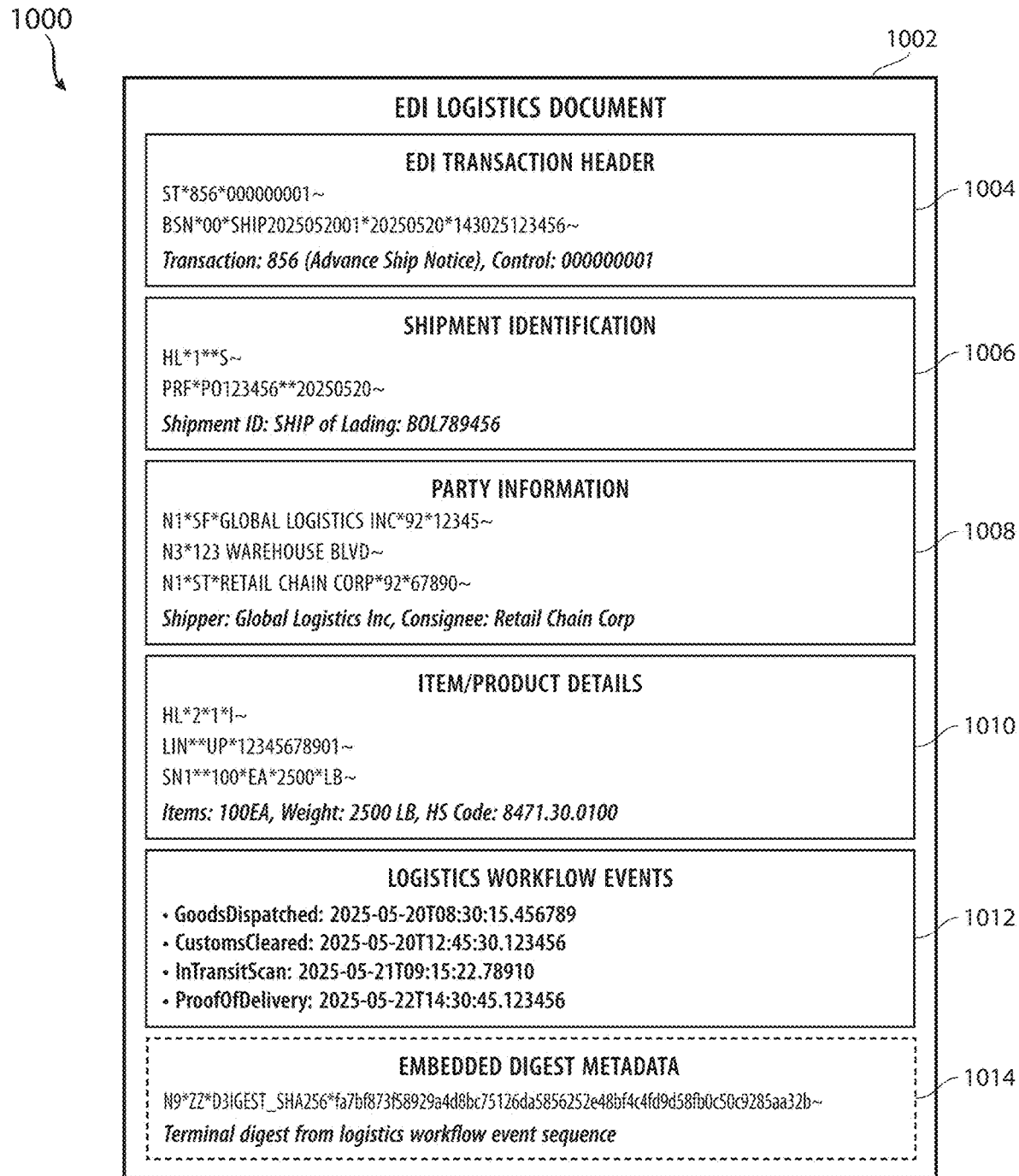
FIG. 10 is a diagram illustrating an example logistics document format with embedded digest metadata, in accordance with some examples.

FIG. 10 is a diagram illustrating an example logistics document format 1000 with embedded digest metadata, per some examples. The example logistics document format 1000 (generalized from an electronic data interchange (EDI)) shows embedded digest metadata. An EDI logistics document 1002 includes an EDI transaction header 1006 that includes, for example, transaction data above an advance ship notice. A shipment identification section 1006 can include a tracking number and bill of lading references. A party information section 1008 can include trading partners and addresses. An item/product detail section 1010 can include product details and harmonized system (HS) classifications. A logistics workflow events section 1012 includes supply chain data and event sequences.

An embedded digest metadata section 1014 represents a terminal digest from the logistics workflow event sequence. This can include a hashed SHA-256 workflow verification digest. The example logistics document format 1000 can represent an EDI X12 compliant XML manifest compatible customs documents. Multilingual extraction support can also be provided for international shipping documents.

Figure 11:
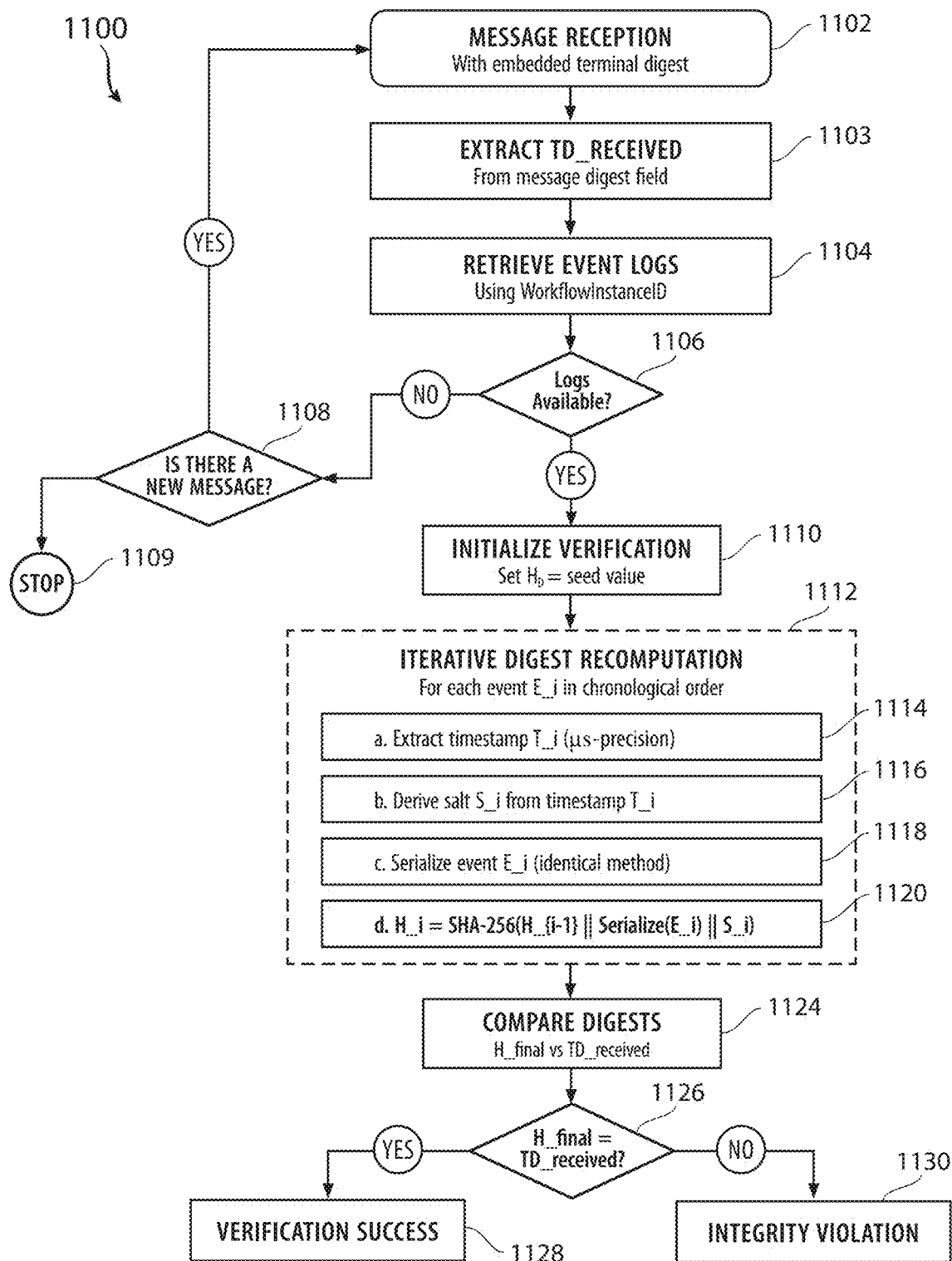
FIG. 11 is a block diagram illustrating an example verification process for an embedded digest message, in accordance with some examples.

FIG. 11 is a block diagram illustrating an example verification process 1100 for an embedded digest message, following some examples. At block 1102, a message is received. Block 1102 can also represent a process of extracting a terminal digest (TD) received from an embedded digest field. At block 1104, an event log is retrieved in which local logs are queried using a workflowinstanceID. Block 1106 represents a query asking if logs are available. If not, then in block 1108, the system determines if there is a new message. If yes, then the process returns to block 1102 related to message reception. If no, then the verification fails as the system cannot verify the integrity of the terminal digest and the process stops at block 1109.

If block 1106 results in a determination that logs are available, then block 1110 initializes verification. The system sets $H_0$=empty or a predefined seed value. At block 1112, an iterative digest re-computation process includes one or more steps. Each event $E_i$ is processed in chronological order. The one or more steps can include an event ordering step at block 1114 that scores events by extracting a timestamp, a salt derivation at block 1116 that calculates $S_i=f(T_i)$ with a certain precision such as microsecond precision, a serialization step at block 1118 that serializes events ($E_i$) using an identical method, a rolling digest step at block 1120 that calculates $H_i$=SHA-256 ($H_{i-1}$||Serialize ($E_i$) |$S_i$). For each event $E_i$ in chronological sequence, steps represented by blocks 1114-1120 are repeated until all events are processed.

At block 1124, a final comparison is performed to compare $H_{final}$ with $TD_{received}$ and at block 1126, a determination is made whether $H_{final}=TD_{received}$. If yes, then block 1128 indicates verification success, and the integrity is confirmed. If no, then block 1130 determines that there is an integrity violation and the event sequence is compromised. The timing of the analysis can be less than, for example, 10 ms.

Figure 12A:
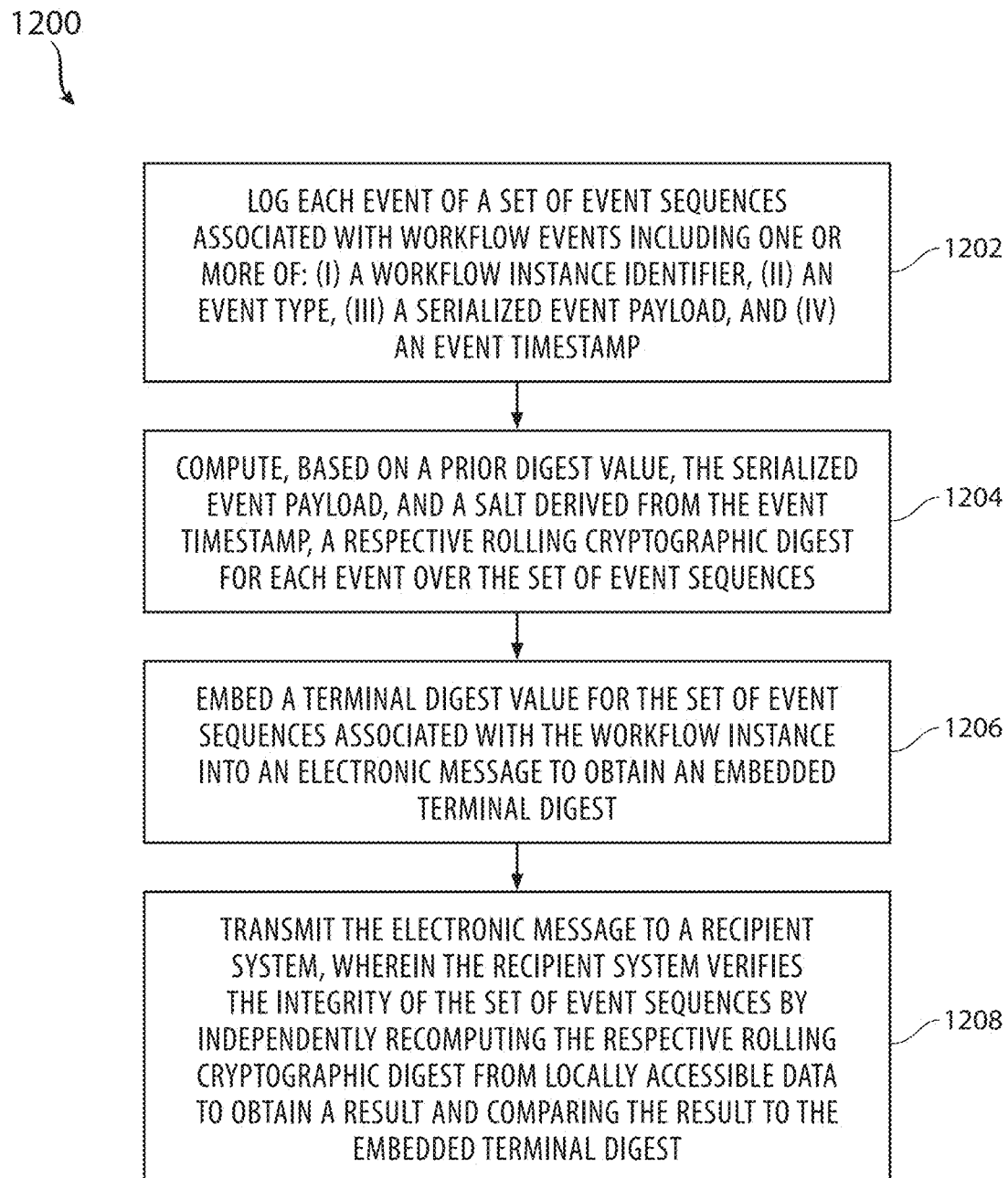
FIG. 12A is a block diagram illustrating an example method for performing cryptographic integrity verification, in accordance with some examples.

FIG. 12A is a block diagram illustrating a first method 1200 that performs cryptographic integrity verification, in accordance with some examples. The first method 1200 can be implemented by a system which can be one or more of the digest embedding system 162, the document extraction system 166, a cloud computing environment 200, a computing system 1500, a storage device 1530, a processor 1510, an AI model 168 and any subcomponent or combination thereof. The first method 1200 relates to a method for verifying the integrity of event sequences of workflow events in a workflow system. The first method 1200 can include any one or more of the outlined steps below. Any combination of two or more of the steps, in any order, can be implemented as an example of the first method 1200.

At block 1202, the first method 1200 can be implemented by a system configured to log each event of a set of event sequences associated with workflow events including one or more of: (i) a workflow instance identifier for a workflow instance, (ii) an event type, (iii) a serialized event payload, and (iv) an event timestamp. The workflow events can include trade lifecycle events including one or more of: "TradeConfirmed," "PaymentSettled," and "DocumentAcknowledged," each associated with a unique trade identifier. In other aspects, the workflow events represent shipment events including one or more of "GoodsDispatched," "CustomsCleared," "InTransitScan," and "ProofOfDelivery," are associated with a Shipment ID. In some aspects, the workflow instance identifier can include a Medical Record Number (MRN) and an Encounter ID.

At block 1204, the first method 1200 can be implemented by a system configured to compute, based on a prior digest value, the serialized event payload, and a salt derived from the event timestamp, a respective rolling cryptographic digest for each event over the set of event sequences. The computation of the respective rolling cryptographic digest can be performed using a hardware security module (HSM). In some aspects, the respective rolling cryptographic digest can include a SHA-256 hash or an equivalent cryptographic hash. In some aspects, the HSM can be a FIPS 140-2 compliant and complete each digest operation in less than 2 ms.

At block 1206, the first method 1200 can be implemented by a system configured to embed a terminal digest value for the set of event sequences associated with the workflow instance into an electronic message to obtain an embedded terminal digest. The electronic message can include a JSON or FIX protocol message, and the embedded terminal digest can be stored in a designated integrity field. The terminal digest can be embedded in a metadata field of a shipping manifest or customs declaration in EDI, XML or equivalent format. The workflow events can include healthcare messages formatted in HL7 or FHIR standards, and the terminal digest can be embedded in a metadata field or extension.

At block 1208, the first method 1200 can be implemented by a system configured to transmit the electronic message to a recipient system, wherein the recipient system verifies the integrity of the set of event sequences by independently recomputing the respective rolling cryptographic digest from locally accessible data to obtain a result and comparing the result to the embedded terminal digest. The event timestamp can have microsecond-level precision. In some cases, the verification by the recipient system occurs in under 10 milliseconds at a 95th percentile.

The first method 1200 can include other steps such as retrying one or more steps of the method up to three times with exponential backoff in case of failure.

The workflow system can operate in a cloud-computing environment. The workflow events can pertain to a financial transaction, and the embedded terminal digest is included in a regulatory reporting message.

In some aspects, the techniques described herein relate to a system for verifying an integrity of event sequences of workflow events in a workflow system, the system including: at least one processor; and a computer-readable storage medium storing instructions, which, when executed by the at least one processor, cause the at least one processor to be configured to: log each event of a set of event sequences associated with workflow events including one or more of: (i) a workflow instance identifier for a workflow instance, (ii) an event type, (iii) a serialized event payload, and (iv) an event timestamp; compute, based on a prior digest value, the serialized event payload, and a salt derived from the event timestamp, a respective rolling cryptographic digest for each event over the set of event sequences associated with the workflow events; embed a terminal digest value for the set of event sequences into an electronic message to obtain an embedded terminal digest; and transmit the electronic message to a recipient system, wherein the recipient system verifies the integrity of the set of event sequences by independently recomputing the respective rolling cryptographic digest from locally accessible data to obtain a result and comparing the result to the embedded terminal digest.

Figure 12B:
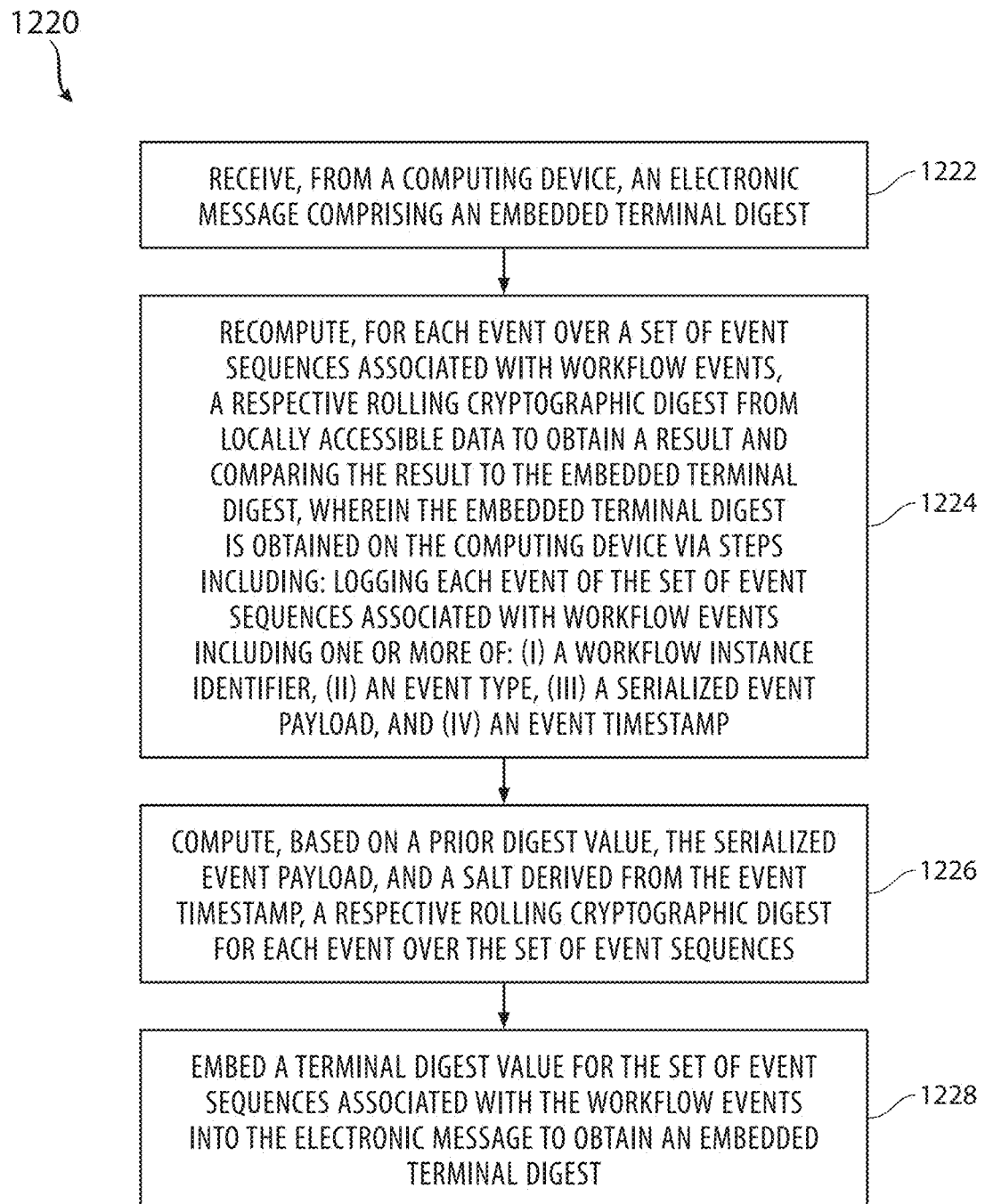
FIG. 12B is a block diagram illustrating an example method for performing cryptographic integrity verification from a device that receives a message, in accordance with some examples.

FIG. 12B is a block diagram illustrating a second method 1220 that performs cryptographic integrity verification, in accordance with some examples. The second method 1220 can be implemented by a system which can be one or more of the digest embedding system 162, a recipient system 214, the document extraction system 166, a cloud computing environment 200, a computing system 1500, a storage device 1530, a processor 1510, an AI model 168 and any subcomponent or combination thereof. The second method 1220 can include any one or more of the outlined steps below. Any combination of two or more of the steps, in any order, can be implemented as an example of the second method 1220.

At block 1222, the second method 1220 can be implemented by a system configured to receive, from a computing device, an electronic message that includes an embedded terminal digest.

At block 1224, the second method 1220 can be implemented by a system configured to recompute, for each event over a set of event sequences associated with workflow events, a respective rolling cryptographic digest from locally accessible data to obtain a result and comparing the result to the embedded terminal digest, wherein the embedded terminal digest is obtained on the computing device via steps including: logging each event of the set of event sequences associated with workflow events including one or more of: (i) a workflow instance identifier for a workflow instance, (ii) an event type, (iii) a serialized event payload, and (iv) an event timestamp.

At block 1226, the second method 1220 can be implemented by a system configured to compute, based on a prior digest value, the serialized event payload, and a salt derived from the event timestamp, a respective rolling cryptographic digest for each event over the set of event sequences.

At block 1228, the second method 1220 can be implemented by a system configured to embed a terminal digest value for the set of event sequences associated with the workflow events into the electronic message to obtain an embedded terminal digest.

In some aspects, the set of event sequences pertains to a financial transaction, and the embedded terminal digest is included in a regulatory reporting message.

In some aspects, a system for verifying an integrity of event sequences of workflow events in a workflow system can include at least one processor; and a computer-readable storage medium storing instructions, which, when executed by the at least one processor, cause the at least one processor to be configured to: receive, from a computing device, an electronic message including an embedded terminal digest; and recompute, for each event over a set of event sequences associated with workflow events, a respective rolling cryptographic digest from locally accessible data to obtain a result and comparing the result to the embedded terminal digest, wherein the embedded terminal digest is obtained on the computing device via steps including: logging each event of the set of event sequences associated with workflow events including one or more of: (i) a workflow instance identifier for a workflow instance, (ii) an event type, (iii) a serialized event payload, and (iv) an event timestamp; compute, based on a prior digest value, the serialized event payload, and a salt derived from the event timestamp, a respective rolling cryptographic digest for each event over the set of event sequences; and embed a terminal digest value for the set of event sequences associated with the workflow events into the electronic message to obtain an embedded terminal digest.

Figure 13:
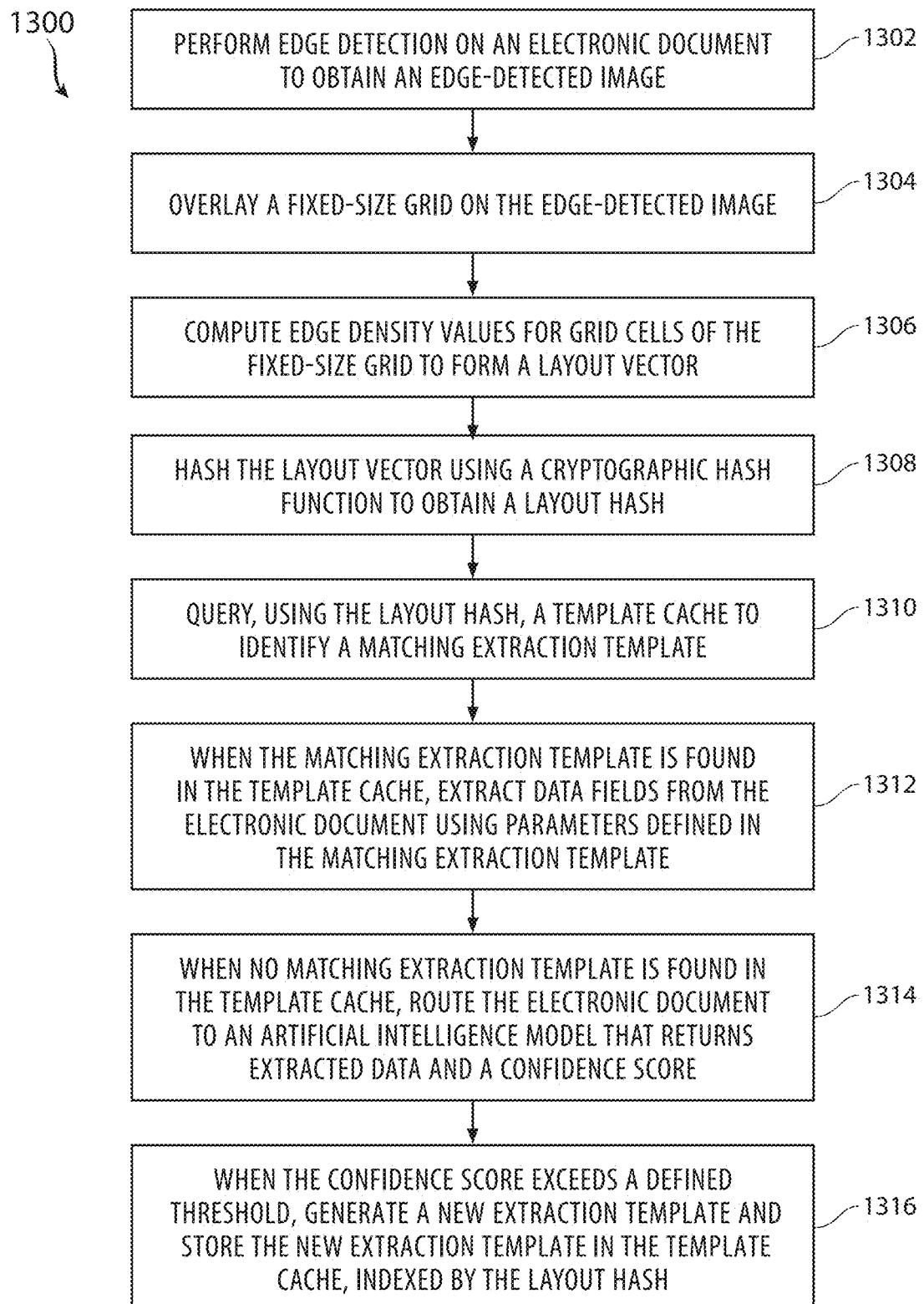
FIG. 13 is a block diagram illustrating an example method of performing adaptive AI document extraction, in accordance with some examples.

FIG. 13 is a block diagram illustrating a third method 1300 of performing adaptive AI document extraction, following some examples. The third method 1300 can be implemented by a system which can be one or more of the digest embedding system 162, the document extraction system 166, a recipient system 214, a cloud computing environment 200, a computing system 1500, a storage device 1530, a processor 1510, an AI model 168 and any subcomponent or combination thereof.

At block 1302, the third method 1300 can be implemented by a system configured to perform edge detection on an electronic document to obtain an edge-detected image. In some aspects, the electronic document can include a document of a particular type such as a healthcare lab report, and the extracted data can include one or more of patient identifiers, test names, values with units and similar data.

In some aspects, the electronic document can include a logistics bill of lading, and the extracted data includes one or more of: shipper, consignee, product description, and weight. The electronic document can also include a trade confirmation in PDF format, and the extracted data includes one or more of: trade date, a security identifier (CUSIP or ISIN), counterparty, and a notional amount. The electronic document can also include a scanned lab report or referral form, and the extracted data includes one or more of: a patient name, lab test identifiers, result values, and units.

In some aspects, the electronic document can include a bill of lading or commercial invoice, and the extracted data includes one or more of: a shipper name, a consignee name, an item description, a weight, and Harmonized System (HS) codes.

At block 1304, the third method 1300 can be implemented by a system configured to overlay a fixed-size grid on the edge-detected image.

At block 1306, the third method 1300 can be implemented by a system configured to compute edge density values for grid cells of the fixed-size grid to form a layout vector.

At block 1308, a step of the third method 1300 can be implemented by a system configured to hash the layout vector using a cryptographic hash function to obtain a layout hash.

At block 1310, the third method 1300 can be implemented by a system configured to query, using the layout hash, a template cache to identify a matching extraction template. In some aspects, the template cache can include a NoSQL database that stores templates as records including layout hashes, bounding box coordinates, regular expressions, and version metadata.

At block 1312, the third method 1300 can be implemented by a system configured, when the matching extraction template is found in the template cache, to extract data fields from the electronic document using parameters defined in the matching extraction template. The parameters can include bounding boxes and regular expressions.

At block 1314, the third method 1300 can be implemented by a system configured, when no matching extraction template is found in the template cache, to route the electronic document to an artificial intelligence model that returns extracted data and a confidence score. In some aspects, the artificial intelligence model can include a multimodal model that can accept both image and text input. In some aspects, when the artificial intelligence model fails to produce results above the defined threshold, the third method 1300 can include applying a secondary model. In some aspects, the secondary model can be an optical character recognition engine.

In some aspects, a fallback extraction path to the artificial intelligence model can be configured to generate FHIR-compliant JSON output from freeform clinical documents. In some aspects, the artificial intelligence model can be configured to handle multi-language and multi-format extraction for any type of document such as a shipping document.

The routing of documents to CPU-based template processing can reduce energy consumption by at least 90% compared to processing all electronic documents through the artificial intelligence model, with energy usage below 3 kWh per thousand documents processed. The artificial intelligence model can also be configured to perform inference using a central processing unit (CPU) when graphical processing unit (GPU) resources are unavailable or insufficient.

At block 1316, the third method 1300 can be implemented by a system configured, when the confidence score exceeds a defined threshold, to: generate a new extraction template and store the new extraction template in the template cache, indexed by the layout hash. In some aspects, the defined threshold for the confidence score can be an aggregate value greater than or equal to 0.90 or some other value such as greater than or equal to at least 0.6.

The third method 1300 can be performed in a cloud computing environment 200. The electronic document can be an image or may be in a PDF format. The layout hash can be computed using SHA-256 over a 1024-dimensional edge density vector derived from a 32×32 grid or an equivalent grid size.

The third method 1300 can include obtaining a normalized version of the electronic document prior to performing edge detection. The third method 1300 can also include aligning the extracted data with internal trade logs and raising an exception flag if discrepancies exceed a predefined threshold.

The third method 1300 can include monitoring and reporting environmental metrics including one or more of: (i) a percentage of documents processed via template versus artificial intelligence paths, (ii) cumulative energy consumption, (iii) an estimated carbon footprint, and (iv) graphical processing unit utilization percentage.

In another aspect, the third method 1300 can include applying an adaptive learning mechanism that reduces graphical processing unit inference requirements to less than 20-40% of electronic documents within a set number of documents of a new document type and less than 10-15% for established document types. The set number of documents can be set at any value, such as one thousand.

The third method 1300 can apply to a CPU-based template processing approach that operates within a 15 W power envelope, enabling deployment on edge devices and mobile platforms.

The third method 1300 can include any one or more of the outlined steps above. Any combination of two or more of the steps, in any order, can be implemented as an example of the third method 1300.

In some aspects, the techniques described herein relate to a system for adaptive extraction of structured data from electronic documents, the system including: at least one processor; and a computer-readable storage medium storing instructions, which, when executed by the at least one processor, cause the at least one processor to be configured to: perform edge detection on an electronic document to obtain an edge-detected image; overlay a fixed-size grid on the edge-detected image; compute edge density values for grid cells of the fixed-size grid to form a layout vector; and hash the layout vector using a cryptographic hash function to obtain a layout hash; query, using the layout hash, a template cache to identify a matching extraction template; when the matching extraction template is found, extracting data fields from the electronic document using parameters defined in the matching extraction template; when no matching extraction template is found, route the electronic document to an artificial intelligence model that returns extracted data and a confidence score; and when the confidence score exceeds a defined threshold: generate a new extraction template; and store the new extraction template in the template cache, indexed by the layout hash.

Figure 14:
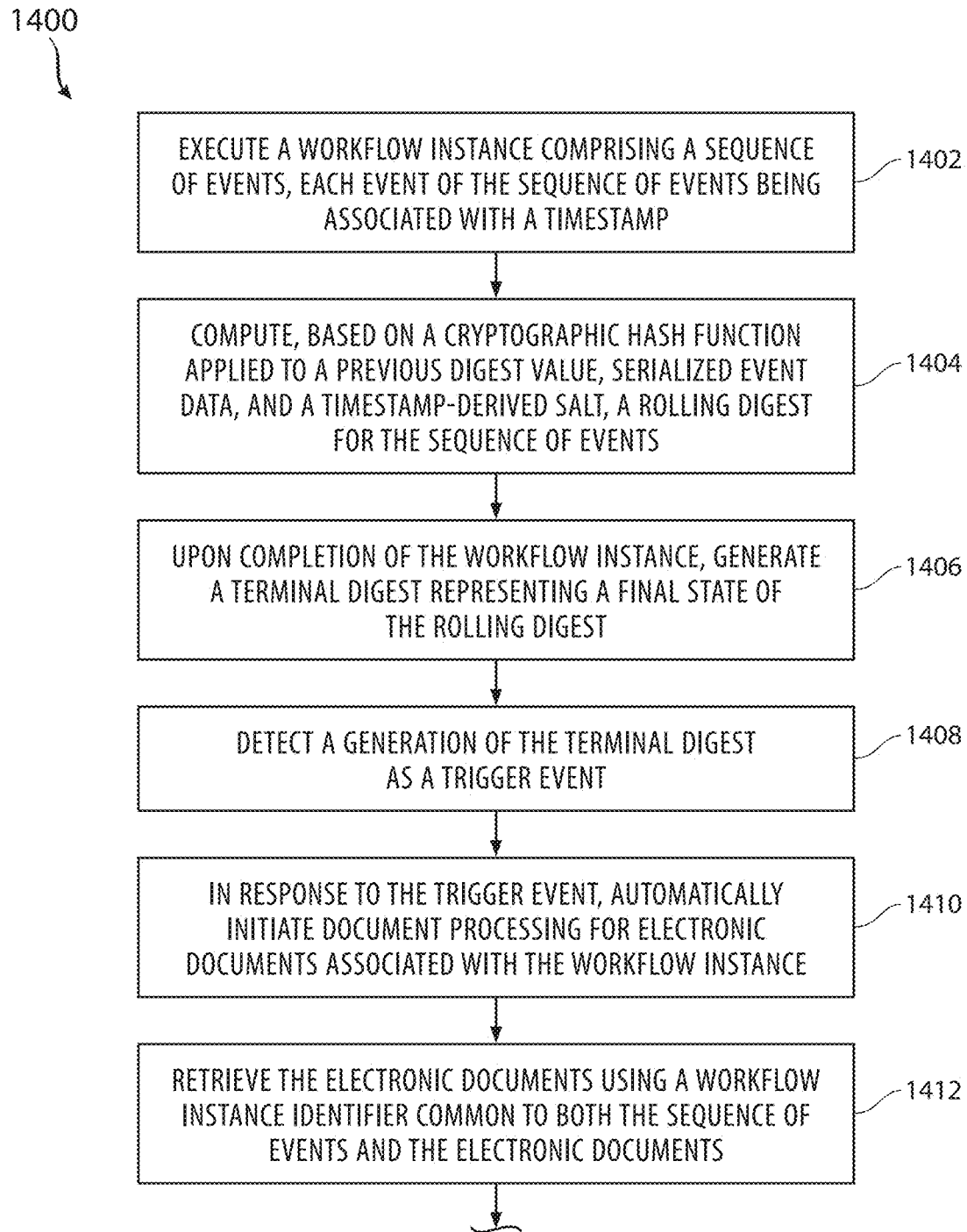
FIG. 14 is a block diagram illustrating an example method integrating the methods of FIG. 12A, FIG. 12B and FIG. 13, in accordance with some examples.
Figure 14:
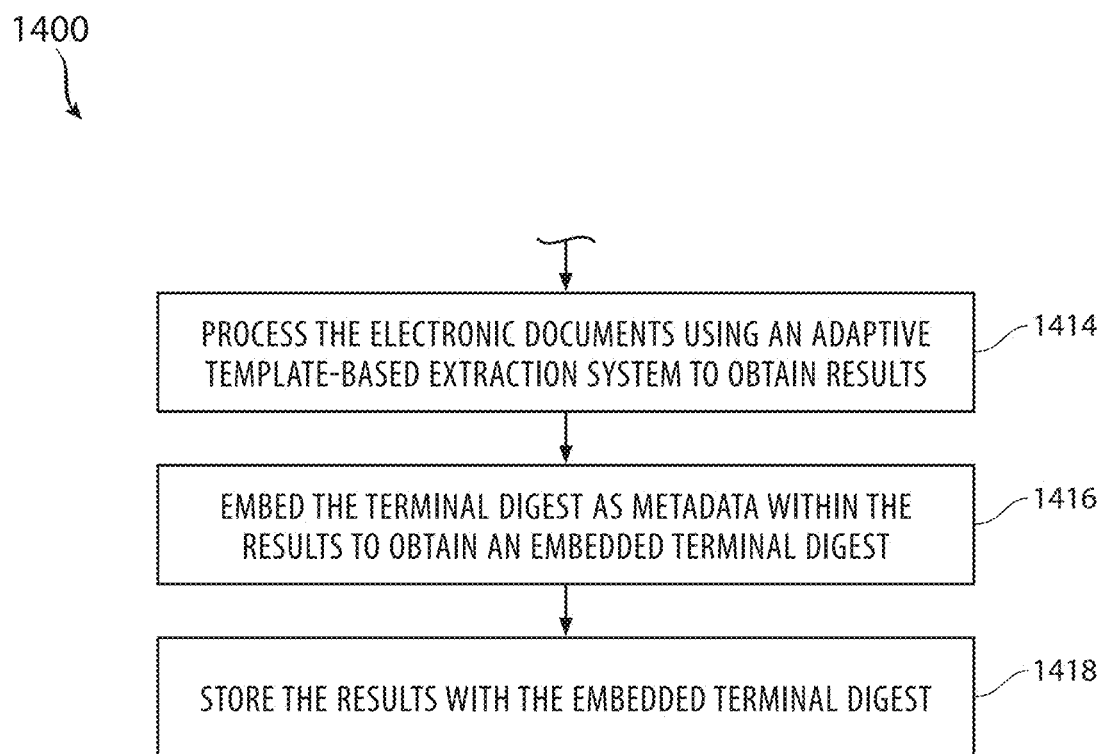

FIG. 14 is a block diagram illustrating a fourth method 1400 for integrating the methods of FIG. 12A, FIG. 12B and FIG. 13, in accordance with some examples. The fourth method 1400 can be implemented by a system which can be one or more of the digest embedding system 162, the recipient system 214, the document extraction system 166, a cloud computing environment 200, a computing system 1500, a storage device 1530, a processor 1510, an AI model 168 and any subcomponent or combination thereof.

The fourth method 1400 can include any one or more of the outlined steps below. Any combination of two or more of the steps, in any order, can be implemented as an example of the fourth method 1400.

At block 1402, the fourth method 1400 can be implemented by a system configured to execute a workflow instance including a sequence of events, each event of the sequence of events being associated with a timestamp. The timestamp can include a high-precision timestamp such as in a microsecond range.

At block 1404, the fourth method 1400 can be implemented by a system configured to compute, based on a cryptographic hash function applied to a previous digest value, serialized event data, and a timestamp-derived salt, a rolling digest for the sequence of events.

At block 1406, the fourth method 1400 can be implemented by a system configured, upon completion of the workflow instance, to generate a terminal digest representing a final state of the rolling digest.

At block 1408, the fourth method 1400 can be implemented by a system configured to detect a generation of the terminal digest as a trigger event.

At block 1410, the fourth method 1400 can be implemented by a system configured, in response to the trigger event, to automatically initiate document processing for electronic documents associated with the workflow instance.

At block 1412, the fourth method 1400 can be implemented by a system configured to retrieve the electronic documents using a workflow instance identifier common to both the sequence of events and the electronic documents.

At block 1414, the fourth method 1400 can be implemented by a system configured to process the electronic documents using an adaptive template-based extraction system to obtain results. In some aspects, the adaptive template-based extraction system can be the document extraction system 166 and can be configured to: compute a layout hash from geometric features of each document of the electronic documents; route documents with matching layout hashes to pre-existing extraction templates, and route documents without matching layout hashes to artificial intelligence-based processing. For example, the AI model 168 can be used to route the documents without matching layout hashes.

At block 1416, the fourth method 1400 can be implemented by a system configured to embed the terminal digest as metadata within the results to obtain an embedded terminal digest. The embedded terminal digest provides cryptographic linkage between verified workflow events and extracted document data.

At block 1418, the fourth method 1400 can be implemented by a system configured to store the results with the embedded terminal digest.

In some aspects, the techniques described herein relate to a system for providing workflow automation including: a first subsystem configured to: log workflow events; compute a timestamp-salted rolling digest using a hardware security module; and embed a terminal digest in a message for external verification; and a second subsystem for processing electronic documents using layout hash-based routing for adaptive extraction, the second subsystem configured to: apply a fast extraction path using cached templates; applying, based on a high confidence determination, a fallback path using a transformer-based artificial intelligence model that generates new templates upon high confidence, wherein the second subsystem is configured to process both event messages and associated electronic documents for a same workflow instance, and wherein the terminal digest generated by the first subsystem serves as a cryptographic trigger or reference for initiating the processing of associated electronic documents in the second subsystem.

In some aspects, the techniques described herein relate to a system for integrated workflow verification and document processing, the system including: at least one processor; and a computer-readable storage medium storing instructions, which, when executed by the at least one processor, cause the at least one processor to be configured to: execute a workflow instance including a sequence of events, each event associated with a high-precision timestamp; compute, based on a cryptographic hash function applied to a previous digest value, serialized event data, and a timestamp-derived salt, a rolling digest for the sequence of events; upon completion of the workflow instance, generate a terminal digest representing a final state of the rolling digest; detect a generation of the terminal digest as a trigger event; in response to the trigger event, automatically initiate document processing for electronic documents associated with the workflow instance; retrieve the electronic documents using a workflow instance identifier common to both the sequence of events and the electronic documents; process the electronic documents using an adaptive template-based extraction system to obtain results; embed the terminal digest as metadata within the results to obtain an embedded terminal digest; and store the results with the embedded terminal digest.

As noted above, the systems disclosed herein (both the digest embedding system and the document extractor system) provide a number of benefits, including energy and cost efficiency benefits. The digest embedding system 162 provides significant energy and environmental advantages over blockchain-based event verification approaches. These include the following. (1) Energy reduction: the timestamp-salted rolling digest mechanism reduces energy consumption by more than 99.97% compared to Proof-of-Stake blockchain systems and more than 99.99% compared to Proof-of-Work blockchain systems. For a system processing 1 million workflow events daily, the digest embedding system 162 consumes approximately 3.65 kWh annually compared to 11,000-37,000 kWh for Proof-of-Stake blockchains and 700,000,000-2,000,000,000 kWh for Proof-of-Work blockchains; (2) Carbon footprint reduction: the energy savings translate to approximately 18-1,000,000 tons of $CO_2$ avoided annually per million daily events, depending on the blockchain alternative considered, supporting organizational sustainability objectives and regulatory compliance with environmental standards; (3) Infrastructure efficiency: unlike blockchain systems that require dedicated mining hardware or continuously operating validator nodes, the digest embedding system 162 leverages existing HSM infrastructure that can be shared across multiple applications, reducing electronic waste and eliminating the need for specialized cooling systems.

There is a technical basis for the efficiency experienced by the disclosed system. The efficiency gains derive from the invention's specific technical architecture. For example, direct computation is achieved. The HSM performs a single SHA-256 computation per event (approximately 10 microjoules) without requiring network consensus, block propagation, or mining operations. The system provides verification efficiency. Recipients verify the digest through simple hash chain re-computation without querying distributed networks or downloading blockchain data, requiring negligible computational resources. The system operates with no network redundancy. Unlike blockchain systems that replicate data across thousands of nodes, each consuming power continuously, the digest embedding system 162 requires only the source system and verification endpoints. The system provides instant finality. Events achieve cryptographic finality immediately upon digest computation, eliminating energy expenditure on consensus mechanisms, block confirmations, or fork resolution.

Next, the system provides scalability without environmental impact. The digest embedding system 162 maintains constant per-event energy consumption regardless of system scale, whereas blockchain networks often experience increased energy consumption as they grow. This linear scalability enables deployment in high-throughput environments (processing millions of events per second) without proportional environmental impact.

The system aligns with environmental regulations and standards. The reduced energy consumption supports compliance with emerging environmental regulations and company ESG goals including: The European Union's Corporate Sustainability Reporting Directive (CSRD); Science Based Targets initiative (SBTi) commitments; and organizational carbon neutrality goals while maintaining cryptographic integrity for event verification.

The system provides energy and cost efficiency benefits of the document extractor system 166. The adaptive AI feature of the document extractor system 166 provides significant energy and cost advantages over traditional GPU-only document processing approaches. These benefits include energy reduction. The layout hash-based routing mechanism reduces energy consumption by more than 90%. It consumes ~2,047 kWh per million documents compared to ~40,000 kWh for a GPU-only, transformer-based extraction pipeline processing the same corpus at equivalent accuracy and throughput. Another benefit is cost optimization. Across major cloud platforms (Google Cloud Platform, Amazon Web Services, Microsoft Azure), the approach reduces total operating costs by 90-93%, from approximately $4,800-$4,900 per million documents to $345-$380 per million documents.

The document extractor system 166 can provide carbon footprint reduction. The energy savings translate to approximately 15,180 kg $CO_2$ avoided per million documents processed, supporting environmental sustainability objectives.

The technical basis for efficiency in the document extractor system 166 includes the following features. The use of layout hash routing, in which the SHA-256 or equivalent hash of edge density vectors enables immediate recognition of known document structures, routing more than 90% of recurring documents to CPU-efficient processing paths. The use of adaptive template generation provides high-confidence AI outputs (>0.9 confidence threshold) and automatically generates reusable extraction templates, progressively reducing fallback AI usage from initial 100% to <5% for established document types.

The approach includes processing time reduction. Template-based extraction reduces per-document processing time from ~4 seconds (AI inference) to ~0.3 seconds (rule-based extraction). The document extractor system 166 is thermally efficiency. CPU-based template processing generates minimal heat (~5 W Thermal Design Power (TDP)) compared to GPU inference (~350 W TDP), reducing cooling requirements by 98% and associated HVAC energy consumption.

The systems provide scalability and deployment benefits as well. The energy efficiency enables practical deployment in resource-constrained environments including edge computing scenarios, mobile applications, branch office servers without dedicated GPU infrastructure, and developing regions with unreliable power grids. This expands the invention's applicability across finance, healthcare, logistics and other domains while maintaining extraction accuracy and system reliability.

The improvements disclosed herein can have data center infrastructure impact. For example, the system can enable cooling load reduction in data centers. The cooling infrastructure overhead for GPU processing (0.7-1.0x) is eliminated when routing to CPU paths, doubling the effective energy savings. The template-based approach reduces cooling requirements at scale, saving an additional 1,000-2,000 kWh per million documents. Data center power infrastructure can be improved. Reduced peak power demand enables deployment in facilities with standard 208V circuits rather than high-amperage 480V infrastructure required for GPU clusters. Data center hardware longevity can be improved. Intermittent GPU usage (only for novel layouts) extends hardware lifespan from the typical 3 years to 5-7 years, reducing embodied carbon from manufacturing.

The improvements disclosed herein can also provide environmental compliance and sustainability metrics. The system enables organizations to meet stringent environmental requirements. The system can reduce scope two emissions (purchased electricity) by >90% for document processing workload. The system can achieve ISO 50001 energy management certification. The system can enable PUE (Power Usage Effectiveness) improvements from typical 1.67 to 1.2 for document processing infrastructure. The system facilitates renewable energy adoption due to lower peak power requirements.

A power consumption analysis for the new system can illustrate that the system achieves power savings through intelligent routing. With the use of the GPU inference path, the system can average 300-350 W GPU+100-150 W supporting infrastructure=400-500 W total. For the template extraction path, the system averages 4-5 W CPU processing+1-2 W memory access=5-7 W total. The power reduction ratio can be shown to be 98.6-98.75% for documents processed via templates.

Figure 15:
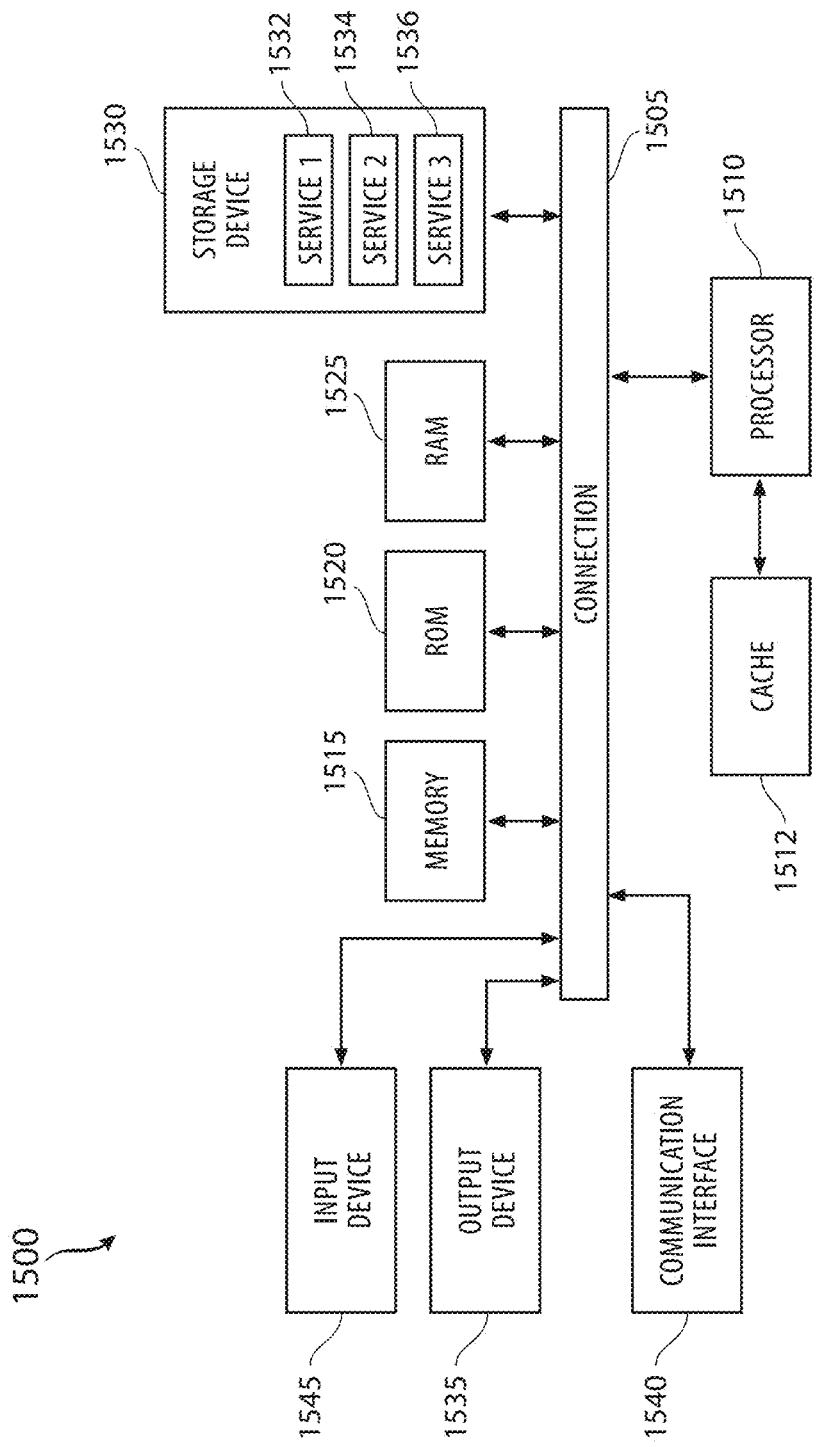
FIG. 15 is a diagram of an example apparatus for wireless communication, in accordance with the present disclosure.

FIG. 15 is a diagram illustrating an example of a system for implementing certain aspects of the present technology. In particular, FIG. 15 illustrates an example of computing system 1500, which can be for example any computing device making up internal computing system, a remote computing system, a camera, a depth map or multiple depth maps, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some aspects, computing system 1500 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 1500 includes at least one processing unit (CPU or processor 1510) and connection 1505 that couples various system components, including memory 1515, such as read-only memory (ROM), such as ROM 1520, and random-access memory 1525 (RAM), to processor 1510. Computing system 1500 can include a cache 1512 of high-speed memory connected directly with, in close proximity to, or integrated as part of processor 1510.

Processor 1510 can include any general-purpose processor and a hardware service or software service, such as services such as a first service 1532, a second service 1534, and a third service 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500. Computing system 1500 can include communications interface 1540, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, WLAN signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/long term evolution (LTE) cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a Europay, Mastercard and Visa (EMV) chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some aspects, a hardware service that performs a particular function can include the software component stored in a computer-readable medium in connection with the necessary hardware components, such as processor 1510, connection 1505, output device 1535, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

The various illustrative logical blocks, modules, engines, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules, engines, or components may be implemented together in an integrated logic device or separately as discrete but interoperable logic devices. If implemented in software, then the techniques may be realized at least in part by a computer-readable data storage medium including program code including instructions that, when executed, performs one or more of the methods, algorithms, and/or operations described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein, may refer to any of the foregoing structures, any combination of the foregoing structures, or any other structure or apparatus suitable for the implementation of the techniques described herein.

Illustrative clauses or aspects of the disclosure include:

Clause Set I (Cryptographic Integrity Verification System)

Clause 1. A method for verifying an integrity of event sequences of workflow events in a workflow system, the method comprising: logging each event of a set of event sequences associated with workflow events comprising one or more of: (i) a workflow instance identifier for a workflow instance, (ii) an event type, (iii) a serialized event payload, and (iv) an event timestamp; computing, based on a prior digest value, the serialized event payload, and a salt derived from the event timestamp, a respective rolling cryptographic digest for each event over the set of event sequences; embedding a terminal digest value for the set of event sequences associated with the workflow instance into an electronic message to obtain an embedded terminal digest; and transmitting the electronic message to a recipient system, wherein the recipient system verifies the integrity of the set of event sequences by independently recomputing the respective rolling cryptographic digest from locally accessible data to obtain a result and comparing the result to the embedded terminal digest.

Clause 2. The method of clause 1, wherein the event timestamp has microsecond-level precision Clause 3. The method of clause 1 or any previous clause, wherein computing the respective rolling cryptographic digest is performed using a hardware security module (HSM).

Clause 4. The method of clause 1 or any previous clause, wherein the respective rolling cryptographic digest comprises a SHA-256 hash or equivalent cryptographic hash.

Clause 5. The method of clause 3 or any previous clause, wherein the HSM is FIPS 140-2 compliant and completes each digest operation in less than 2 milliseconds.

Clause 6. The method of clause 1 or any previous clause, wherein verification by the recipient system occurs in under 10 milliseconds at a 95th percentile.

Clause 7. The method of clause 1 or any previous clause, wherein the electronic message comprises a JSON or FIX protocol message, and the embedded terminal digest is stored in a designated integrity field.

Clause 8. The method of clause 1 or any previous clause, further comprising: retrying one or more steps of the method up to three times with exponential backoff in case of failure.

Clause 9. The method of clause 1, wherein the workflow system operates in a cloud-computing environment.

Clause 10. The method of clause 1 or any previous clause, wherein the workflow events pertain to a financial transaction, and the embedded terminal digest is included in a regulatory reporting message.

Clause 11. The method of clause 1 or any previous clause, wherein the workflow events comprise trade lifecycle events comprising one or more of: "TradeConfirmed," "PaymentSettled," and "DocumentAcknowledged," each associated with a unique trade identifier.

Clause 12. The method of clause 1 or any previous clause, wherein the workflow events comprise healthcare messages formatted in HL7 or FHIR standards, and the terminal digest value is embedded in a metadata field or extension.

Clause 13. The method of clause 1 or any previous clause, wherein the workflow instance identifier comprises a Medical Record Number (MRN) and an Encounter ID.

Clause 14. The method of clause 1 or any previous clause, wherein the workflow events represent shipment events including "GoodsDispatched," "CustomsCleared," "InTransitScan," and "ProofOfDelivery," are associated with a Shipment ID.

Clause 15. The method of clause 1 or any previous clause, wherein the terminal digest value is embedded in a metadata field of a shipping manifest or customs declaration in EDI, XML or equivalent format.

Clause 16. A system for verifying an integrity of event sequences of workflow events in a workflow system, the system comprising: at least one processor; and a computer-readable storage medium storing instructions, which, when executed by the at least one processor, cause the at least one processor to be configured to: log each event of a set of event sequences associated with workflow events comprising one or more of: (i) a workflow instance identifier for a workflow instance, (ii) an event type, (iii) a serialized event payload, and (iv) an event timestamp; compute, based on a prior digest value, the serialized event payload, and a salt derived from the event timestamp, a respective rolling cryptographic digest for each event over the set of event sequences associated with the workflow events; embed a terminal digest value for the set of event sequences into an electronic message to obtain an embedded terminal digest; and transmit the electronic message to a recipient system, wherein the recipient system verifies the integrity of the set of event sequences by independently recomputing the respective rolling cryptographic digest from locally accessible data to obtain a result and comparing the result to the embedded terminal digest.

Clause 17. A method comprising: receiving, from a computing device, an electronic message comprising an embedded terminal digest; and recomputing, for each event over a set of event sequences associated with workflow events, a respective rolling cryptographic digest from locally accessible data to obtain a result and comparing the result to the embedded terminal digest, wherein the embedded terminal digest is obtained on the computing device via steps comprising: logging each event of the set of event sequences associated with workflow events comprising one or more of: (i) a workflow instance identifier for a workflow instance for a workflow instance, (ii) an event type, (iii) a serialized event payload, and (iv) an event timestamp; computing, based on a prior digest value, the serialized event payload, and a salt derived from the event timestamp, a respective rolling cryptographic digest for each event over the set of event sequences; and embedding a terminal digest value for the set of event sequences associated with the workflow events into the electronic message to obtain an embedded terminal digest.

Clause 18. The method of clause 17, wherein the set of event sequences pertains to a financial transaction, and the embedded terminal digest is included in a regulatory reporting message.

Clause 19. The method of clause 17, wherein the set of event sequences pertains to trade lifecycle events comprising one or more of: "TradeConfirmed," "PaymentSettled," and "DocumentAcknowledged," each associated with a unique trade identifier.

Clause 20. The method of clause 17, wherein the set of event sequences pertains to healthcare messages formatted in HL7 or FHIR standards, and the terminal digest value is embedded in a metadata field or extension.

Clause Set II (Adaptive AI Document Extractor System)

Clause 1. A method for adaptive extraction of structured data from electronic documents, the method comprising: performing edge detection on an electronic document to obtain an edge-detected image; overlaying a fixed-size grid on the edge-detected image; computing edge density values for grid cells of the fixed-size grid to form a layout vector; and hashing the layout vector using a cryptographic hash function to obtain a layout hash; querying, using the layout hash, a template cache to identify a matching extraction template; when the matching extraction template is found in the template cache, extracting data fields from the electronic document using parameters defined in the matching extraction template; when no matching extraction template is found in the template cache, routing the electronic document to an artificial intelligence model that returns extracted data and a confidence score, wherein the artificial intelligence model is configured to perform inference using a central processing unit (CPU) when graphical processing unit (GPU) resources are unavailable or insufficient; and when the confidence score exceeds a defined threshold: generating a new extraction template; and storing the new extraction template in the template cache, indexed by the layout hash.

Clause 2. The method of clause 1, wherein the method is performed in a cloud computing environment.

Clause 3. The method of clause 1 or any previous clause, wherein the electronic document is an image or is in a PDF format.

Clause 4. The method of clause 1 or any previous clause, wherein the layout hash is computed using SHA-256 over a 1024-dimensional edge density vector derived from a 32×32 grid or equivalent.

Clause 5. The method of clause 1 or any previous clause, further comprising: obtaining a normalized version of the electronic document prior to performing edge detection.

Clause 6. The method of clause 1 or any previous clause, wherein the parameters comprise bounding boxes and regular expressions.

Clause 7. The method of clause 1 or any previous clause, wherein the artificial intelligence model comprises a multimodal model that can accept both image and text input.

Clause 8. The method of clause 1 or any previous clause, wherein the defined threshold for the confidence score is an aggregate value greater than or equal to 0.90.

Clause 9. The method of clause 1 or any previous clause, wherein the template cache comprises a NoSQL database that stores templates as records comprising layout hashes, bounding box coordinates, regular expressions, and version metadata.

Clause 10. The method of clause 1 or any previous clause, further comprising: when the artificial intelligence model fails to produce results above the defined threshold, applying a secondary model.

Clause 11. The method of clause 10 or any previous clause, wherein the secondary model is an optical character recognition engine.

Clause 12. The method of clause 1 or any previous clause, wherein the electronic document comprises a healthcare lab report, and the extracted data includes one or more of patient identifiers, test names, values with units and similar data.

Clause 13. The method of clause 1 or any previous clause, wherein the electronic document comprises a logistics bill of lading, and the extracted data comprises one or more of: shipper, consignee, product description, and weight.

Clause 14. The method of clause 1 or any previous clause, wherein the electronic document comprises a trade confirmation in PDF format, and the extracted data comprises one or more of: trade date, a security identifier (CUSIP or ISIN), counterparty, and a notional amount.

Clause 15. The method of clause 1 or any previous clause, further comprising: aligning the extracted data with internal trade logs; and raising an exception flag if discrepancies exceed a predefined threshold.

Clause 16. The method of clause 1 or any previous clause, wherein the electronic document comprises a scanned lab report or referral form, and the extracted data comprises one or more of: a patient name, lab test identifiers, result values, and units.

Clause 17. The method of clause 1 or any previous clause, wherein a fallback extraction path to the artificial intelligence model is configured to generate FHIR-compliant JSON output from freeform clinical documents.

Clause 18. The method of clause 1 or any previous clause, wherein the electronic document comprises a bill of lading or commercial invoice, and the extracted data comprises one or more of: a shipper name, a consignee name, an item description, a weight, and Harmonized System (HS) codes.

Clause 19. The method of clause 1 or any previous clause, wherein the artificial intelligence model is configured to handle multi-language and multi-format extraction for shipping documents.

Clause 20. The method of clause 1 or any previous clause, wherein the routing of documents to CPU-based template processing reduces energy consumption by at least 90% compared to processing all electronic documents through the artificial intelligence model, with energy usage below 3 kWh per thousand documents processed.

Clause 21. The method of clause 1 or any previous clause, further comprising: monitoring and reporting environmental metrics comprising one or more of: (i) a percentage of documents processed via template versus artificial intelligence paths, (ii) cumulative energy consumption, (iii) an estimated carbon footprint, and (iv) graphical processing unit utilization percentage.

Clause 22. The method of clause 1 or any previous clause, further comprising: applying an adaptive learning mechanism that reduces graphical processing unit inference requirements to less than 20-40% of electronic documents within a set number of documents of a new document type and less than 10-15% for established document types.

Clause 23. The method of clause 22 or any previous clause, wherein the set number of documents is 1,000.

Clause 24. The method of clause 1 or any previous clause, wherein the method applies to a CPU-based template processing approach that operates within a 15 W power envelope, enabling deployment on edge devices and mobile platforms.

Clause 25. A system for adaptive extraction of structured data from electronic documents, the system comprising: at least one processor; and a computer-readable storage medium storing instructions, which, when executed by the at least one processor, cause the at least one processor to be configured to: perform edge detection on an electronic document to obtain an edge-detected image; overlay a fixed-size grid on the edge-detected image; compute edge density values for grid cells of the fixed-size grid to form a layout vector; and hash the layout vector using a cryptographic hash function to obtain a layout hash; query, using the layout hash, a template cache to identify a matching extraction template; when the matching extraction template is found, extracting data fields from the electronic document using parameters defined in the matching extraction template; when no matching extraction template is found, route the electronic document to an artificial intelligence model that returns extracted data and a confidence score, wherein the artificial intelligence model is configured to perform inference using a central processing unit (CPU) when graphical processing unit (GPU) resources are unavailable or insufficient; and when the confidence score exceeds a defined threshold: generate a new extraction template; and store the new extraction template in the template cache, indexed by the layout hash.

Clause 26. A computer-readable storage medium storing instructions for adaptive extraction of structured data from electronic documents, wherein the instructions, when executed by at least one processor, cause the at least one processor to be configured to: perform edge detection on an electronic document to obtain an edge-detected image; overlay a fixed-size grid on the edge-detected image; compute edge density values for grid cells of the fixed-size grid to form a layout vector; and hash the layout vector using a cryptographic hash function to obtain a layout hash; query, using the layout hash, a template cache to identify a matching extraction template; when the matching extraction template is found, extracting data fields from the electronic document using parameters defined in the matching extraction template; when no matching extraction template is found, route the electronic document to an artificial intelligence model that returns extracted data and a confidence score; and when the confidence score exceeds a defined threshold: generate a new extraction template; and store the new extraction template in the template cache, indexed by the layout hash.

Clause Set III (Integrated Method and System claims)

Clause 1. A system for providing workflow automation comprising: a first subsystem configured to: log workflow events; compute a timestamp-salted rolling digest using a hardware security module; and embed a terminal digest in a message for external verification; and a second subsystem for processing electronic documents using layout hash-based routing for adaptive extraction, the second subsystem configured to: apply a fast extraction path using cached templates; applying, based on a high confidence determination, a fallback path using a transformer-based artificial intelligence model that generates new templates upon high confidence, wherein the second subsystem is configured to process both event messages and associated electronic documents for a same workflow instance.

Clause 2. The system of clause 1, wherein the system comprises a cloud-based workflow automation platform.

Clause 3. The system of clause 1 or any previous clause, wherein the system provides verifiable integrity and adaptive extraction in a unified platform comprising the first subsystem and the second subsystem.

Clause 4. The system of clause 1 or any previous clause, wherein the terminal digest from the first subsystem is stored in metadata associated with an electronic document processed by the second subsystem.

Clause 5. The system of clause 1 or any previous clause, wherein the first subsystem and the second subsystem both operate in a containerized environment orchestrated by a cloud-based cluster management system.

Clause 6. A method for integrated workflow verification and document processing, the method comprising: executing a workflow instance comprising a sequence of events, each event of the sequence of events being associated with a timestamp; computing, based on a cryptographic hash function applied to a previous digest value, serialized event data, and a timestamp-derived salt, a rolling digest for the sequence of events; upon completion of the workflow instance, generating a terminal digest representing a final state of the rolling digest; detecting a generation of the terminal digest as a trigger event; in response to the trigger event, automatically initiating document processing for electronic documents associated with the workflow instance; retrieving the electronic documents using a workflow instance identifier common to both the sequence of events and the electronic documents; processing the electronic documents using an adaptive template-based extraction system to obtain results; embedding the terminal digest as metadata within the results to obtain an embedded terminal digest; and storing the results with the embedded terminal digest.

Clause 7. The method of clause 6, wherein the embedded terminal digest provides cryptographic linkage between verified workflow events and extracted document data.

Clause 8. The method of clause 6 or any previous clause, wherein the timestamp comprises a high-precision timestamp.

Clause 9. The method of clause 6 or any previous clause, wherein the adaptive template-based extraction system is configured to compute a layout hash from geometric features of each document of the electronic documents.

Clause 10. The method of clause 9 or any previous clause, wherein the adaptive template-based extraction system is configured to route documents with matching layout hashes to pre-existing extraction templates.

Clause 11. The method of clause 10 or any previous clause, wherein the adaptive template-based extraction system is configured to route documents without matching layout hashes to artificial intelligence-based processing.

Clause 12. A system for integrated workflow verification and document processing, the system comprising: at least one processor; and a computer-readable storage medium storing instructions, which, when executed by the at least one processor, cause the at least one processor to be configured to: execute a workflow instance comprising a sequence of events, each event associated with a high-precision timestamp; compute, based on a cryptographic hash function applied to a previous digest value, serialized event data, and a timestamp-derived salt, a rolling digest for the sequence of events; upon completion of the workflow instance, generate a terminal digest representing a final state of the rolling digest; detect a generation of the terminal digest as a trigger event; in response to the trigger event, automatically initiate document processing for electronic documents associated with the workflow instance; retrieve the electronic documents using a workflow instance identifier common to both the sequence of events and the electronic documents; process the electronic documents using an adaptive template-based extraction system to obtain results; embed the terminal digest as metadata within the results to obtain an embedded terminal digest; and store the results with the embedded terminal digest.

Clause 13. The system of clause 12, wherein the embedded terminal digest provides a cryptographic linkage between verified workflow events and extracted document data.

Clause 14. The system of clause 12 or any previous clause, wherein the embedded terminal digest provides cryptographic linkage between verified workflow events and extracted document data.

Clause 15. The system of clause 12 or any previous clause, wherein the timestamp comprises a high-precision timestamp.

Clause 16. The system of clause 12 or any previous clause, wherein the adaptive template-based extraction system is configured to compute a layout hash from geometric features of each document of the electronic documents.

Clause 17. The system of clause 16 or any previous clause, wherein the adaptive template-based extraction system is configured to route documents with matching layout hashes to pre-existing extraction templates.

Clause 18. The system of clause 17 or any previous clause, wherein the adaptive template-based extraction system is configured to route documents without matching layout hashes to artificial intelligence-based processing.

Clause 19. The system of clause 12, wherein the system comprises a blockchain-based system.

Clause 20. The system of clause 12 or any previous clause, wherein the system operates in a containerized environment orchestrated by a cloud-based cluster management system.

What is claimed is:

1. A method for adaptive extraction of structured data from electronic documents, the method comprising:
performing edge detection on an electronic document to obtain an edge-detected image;
overlaying a fixed-size grid on the edge-detected image;
computing edge density values for grid cells of the fixed-size grid to form a layout vector; and
hashing the layout vector using a cryptographic hash function to obtain a layout hash;
querying, using the layout hash, a template cache to identify a matching extraction template;

when the matching extraction template is found in the template cache, extracting data fields from the electronic document using parameters defined in the matching extraction template;

when no matching extraction template is found in the template cache, routing the electronic document to an artificial intelligence model that returns extracted data and a confidence score; and when the confidence score exceeds a defined threshold:
generating a new extraction template; and
storing the new extraction template in the template cache, indexed by the layout hash.

2. The method of claim 1, wherein the method is performed in a cloud computing environment.

3. The method of claim 1, wherein the electronic document is an image or is in a PDF format.

4. The method of claim 1, wherein the layout hash is computed using SHA-256 over a 1024-dimensional edge density vector derived from a 32×32 grid or equivalent.

5. The method of claim 1, further comprising:
obtaining a normalized version of the electronic document prior to performing edge detection.

6. The method of claim 1, wherein the parameters comprise bounding boxes and regular expressions.

7. The method of claim 1, wherein the artificial intelligence model comprises a multimodal model that can accept both image and text input.

8. The method of claim 1, wherein the defined threshold for the confidence score is an aggregate value greater than or equal to 0.90.

9. The method of claim 1, wherein the template cache comprises a NoSQL database that stores templates as records comprising layout hashes, bounding box coordinates, regular expressions, and version metadata.

10. The method of claim 1, further comprising:
when the artificial intelligence model fails to produce results above the defined threshold, applying a secondary model.

11. The method of claim 10, wherein the secondary model is an optical character recognition engine.

12. The method of claim 1, wherein the electronic document comprises a healthcare lab report, and the extracted data includes one or more of patient identifiers, test names, values with units and similar data.

13. The method of claim 1, wherein the electronic document comprises a logistics bill of lading, and the extracted data comprises one or more of: shipper, consignee, product description, and weight.

14. The method of claim 1, wherein the electronic document comprises a trade confirmation in PDF format, and the extracted data comprises one or more of: trade date, a security identifier (CUSIP or ISIN), counterparty, and a notional amount.

15. The method of claim 1, further comprising:
aligning the extracted data with internal trade logs; and
raising an exception flag if discrepancies exceed a predefined threshold.

16. The method of claim 1, wherein the electronic document comprises a scanned lab report or referral form, and the extracted data comprises one or more of: a patient name, lab test identifiers, result values, and units.

17. The method of claim 1, wherein a fallback extraction path to the artificial intelligence model is configured to generate FHIR-compliant JSON output from freeform clinical documents.

18. The method of claim 1, wherein the electronic document comprises a bill of lading or commercial invoice, and the extracted data comprises one or more of: a shipper name, a consignee name, an item description, a weight, and Harmonized System (HS) codes.

19. The method of claim 1, wherein the artificial intelligence model is configured to handle multi-language and multi-format extraction for shipping documents.

20. The method of claim 1, wherein the routing of documents to CPU-based template processing reduces energy consumption by at least 90% compared to processing all electronic documents through the artificial intelligence model, with energy usage below 3 kWh per thousand documents processed.

21. The method of claim 1, further comprising:
monitoring and reporting environmental metrics comprising one or more of: (i) a percentage of documents processed via template versus artificial intelligence paths, (ii) cumulative energy consumption, (iii) an estimated carbon footprint, and (iv) graphical processing unit utilization percentage.

22. The method of claim 1, further comprising:
applying an adaptive learning mechanism that reduces graphical processing unit inference requirements to less than 20-40% of electronic documents within a set number of documents of a new document type and less than 10-15% for established document types.

23. The method of claim 22, wherein the set number of documents is 1,000.

24. The method of claim 1, wherein the method applies to a CPU-based template processing approach that operates within a 15 W power envelope, enabling deployment on edge devices and mobile platforms.

25. The method of claim 1, wherein the artificial intelligence model is configured to perform inference using a central processing unit (CPU) when graphical processing unit (GPU) resources are unavailable or insufficient.

26. A system for adaptive extraction of structured data from electronic documents, the system comprising:
at least one processor; and
a computer-readable medium storing instructions, which, when executed by the at least one processor, cause the at least one processor to be configured to:
perform edge detection on an electronic document to obtain an edge-detected image;
overlay a fixed-size grid on the edge-detected image;
compute edge density values for grid cells of the fixed-size grid to form a layout vector; and
hash the layout vector using a cryptographic hash function to obtain a layout hash;
query, using the layout hash, a template cache to identify a matching extraction template;
when the matching extraction template is found, extracting data fields from the electronic document using parameters defined in the matching extraction template;
when no matching extraction template is found, route the electronic document to an artificial intelligence model that returns extracted data and a confidence score; and
when the confidence score exceeds a defined threshold:
generate a new extraction template; and
store the new extraction template in the template cache, indexed by the layout hash.

27. A computer-readable storage medium storing instructions for adaptive extraction of structured data from electronic documents, wherein the instructions, when executed by at least one processor, cause the at least one processor to be configured to:

perform edge detection on an electronic document to obtain an edge-detected image;
overlay a fixed-size grid on the edge-detected image;
compute edge density values for grid cells of the fixed-size grid to form a layout vector; and
hash the layout vector using a cryptographic hash function to obtain a layout hash;
query, using the layout hash, a template cache to identify a matching extraction temp late;
when the matching extraction template is found, extracting data fields from the electronic document using parameters defined in the matching extraction template;
when no matching extraction template is found, route the electronic document to an artificial intelligence model that returns extracted data and a confidence score; and
when the confidence score exceeds a defined threshold:
  generate a new extraction template; and
  store the new extraction template in the template cache, indexed by the layout hash.

* * * * *